(12) United States Patent
Kumano

(10) Patent No.: US 10,268,644 B2
(45) Date of Patent: Apr. 23, 2019

(54) INFORMATION PROCESSING APPARATUS, COMPUTER-READABLE RECORDING MEDIUM HAVING STORED THEREIN DATA CONVERSION PROGRAM, AND DATA CONVERSION METHOD

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 731 days.

(21) Appl. No.: 14/601,275

(22) Filed: Jan. 21, 2015

(65) Prior Publication Data

US 2015/0242453 A1 Aug. 27, 2015

(30) Foreign Application Priority Data

Feb. 24, 2014 (JP) ................................. 2014-032652

(51) Int. Cl.
*G06F 16/00* (2019.01)
*G06F 16/28* (2019.01)
*G06F 17/30* (2006.01)

(52) U.S. Cl.
CPC ...... *G06F 16/282* (2019.01); *G06F 17/30589* (2013.01)

(58) Field of Classification Search
CPC ......... G06F 17/30589; G06F 17/30516; G06F 17/30569; G06F 17/30923; G06F 3/061; G06F 3/0638; G06F 3/0656; G06F 3/0659; G06F 3/0673; G06F 9/3001
See application file for complete search history.

(56) References Cited

U.S. PATENT DOCUMENTS

| | | | |
|---|---|---|---|
| 6,374,252 B1 | 4/2002 | Althoff et al. | |
| 2007/0219959 A1* | 9/2007 | Kanemasa | G06F 17/30545 707/999.003 |
| 2009/0089742 A1* | 4/2009 | Nagulu | G06F 9/4443 717/106 |
| 2010/0010960 A1* | 1/2010 | Singh | G06F 17/30498 707/E17.005 |

FOREIGN PATENT DOCUMENTS

| | | |
|---|---|---|
| JP | 09-319811 | 12/1997 |
| JP | 11-504451 | 4/1999 |
| JP | 2002-117020 A | 4/2002 |
| JP | 2005-202850 A | 7/2005 |

OTHER PUBLICATIONS

Japanese Office Action dated Sep. 5, 2017 for corresponding Japanese Patent Application No. 2014-032652, with Partial English Translation, 6 pages.

* cited by examiner

*Primary Examiner* — Dinku W Gebresenbet
(74) *Attorney, Agent, or Firm* — Fujitsu Patent Center

(57) ABSTRACT

An information processing apparatus includes a processor. The processor converts data of a hierarchical structure including a nested structure inputted in a first data format into a second data format representing the data using a plurality of tables and stores the converted data into a storing unit. The processor generates, for each information element of the inputted data, a first table including a value of the information element, and associates each of a plurality of the first tables with a corresponding another first table according to the nested structure of the data and generates a second table by integrating the first tables that satisfy a predetermined condition among the plurality of the first tables.

9 Claims, 24 Drawing Sheets

FIG. 7

```
document-id: 20
{
  url: "ggg",
  title: "google",
  tags: ["goo", "gle"],
  bookmarks: [
    {user: "userA", comment: "search engine", tags: [{tag: "search", chars: ["s", "e", "a"]}, {tag: "engine", chars: ["e", "n", "g"]}]},
    {user: "userB", comment: "default program", tags: [{tag: "default", chars: ["d", "e"]}, {tag: "program", chars: ["p", "r"]}]}
  ]
},
document-id: 30
{
  url: "yyy",
  title: "yahoo",
  tags: ["goo"],
  bookmarks: [
    {user: "userA", comment: "yahoooooo", tags: [{tag: "yah", chars: ["y", "a", "h"]}, {tag: "ooo", chars: ["o"]}]}
  ]
}
```

FIG. 10

TABLE : url  (412a, T2)

| parent UNIQUE | value | |
|---|---|---|
| 20 | ggg | T2 |
| 30 | yyy | T31 |

TABLE : title (412b, T3)

| parent UNIQUE | value | |
|---|---|---|
| 20 | google | T3 |
| 30 | yahoo | T32 |

TABLE : tags (412c, T4)

| parent | value | |
|---|---|---|
| 20 | goo | T4 |
| 20 | gle | T5 |
| 30 | yah | T33 |

TABLE : bookmarks (412d, T6)

| parent | id UNIQUE AUTO_INCREMENT | |
|---|---|---|
| 20 | 0 | T6 |
| 20 | 1 | T19 |
| 30 | 2 | T34 |

TABLE : bookmarks.user (412e, T7)

| parent UNIQUE | value | |
|---|---|---|
| 0 | userA | T7 |
| 1 | userB | T20 |
| 2 | userA | T35 |

TABLE : bookmarks.comment (412f, T8)

| parent UNIQUE | value | |
|---|---|---|
| 0 | search engine | T8 |
| 1 | default program | T21 |
| 2 | yahoooooo | T36 |

TABLE : bookmarks.tags  412g  ~T9  412

| parent | id UNIQUE AUTO_INCREMENT | |
|---|---|---|
| 0 | 0 | ~T9 |
| 0 | 1 | ~T14 |
| 1 | 2 | ~T22 |
| 1 | 3 | ~T26 |
| 2 | 4 | ~T37 |
| 2 | 5 | ~T42 |

TABLE : bookmarks.tags.tag  412h  ~T10

| parent UNIQUE | value | |
|---|---|---|
| 0 | search | ~T10 |
| 1 | engine | ~T15 |
| 2 | default | ~T23 |
| 3 | program | ~T27 |
| 4 | yahoo | ~T38 |
| 5 | ooo | ~T43 |

TABLE : bookmarks.tags.chars  412i  ~T11

| parent UNIQUE | value | |
|---|---|---|
| 0 | s | ~T11 |
| 0 | e | ~T12 |
| 0 | a | ~T13 |
| 1 | e | ~T16 |
| 1 | n | ~T17 |
| 1 | g | ~T18 |
| 2 | d | ~T24 |
| 2 | e | ~T25 |
| 3 | p | ~T28 |
| 3 | r | ~T29 |
| 4 | y | ~T39 |
| 4 | a | ~T40 |
| 4 | h | ~T41 |
| 5 | o | ~T44 |

FIG. 12

TABLE: url_title  ~414

| _parent UNIQUE | url | title |
|---|---|---|
| 20 | ggg | google |
| 30 | yyy | yahoo |

414a

TABLE: tags

| _parent | tags |
|---|---|
| 20 | goo |
| 20 | gle |
| 30 | yah |

414b

TABLE: bookmarks_.user_.comment

| _parent | _id UNIQUE AUTO_INCREMENT | user | comment |
|---|---|---|---|
| 20 | 0 | userA | search engine |
| 20 | 1 | userB | default program |
| 30 | 2 | userA | yahooooo |

414c

TABLE: bookmarks.tags_.tag

| _parent | _id UNIQUE AUTO_INCREMENT | tag |
|---|---|---|
| 0 | 0 | search |
| 0 | 1 | engine |
| 1 | 2 | default |
| 1 | 3 | program |
| 2 | 4 | yah |
| 2 | 5 | ooo |

TABLE : bookmarks.tags.chars  ~414
~414e

| _parent | chars |
|---|---|
| 0 | s |
| 0 | e |
| 0 | a |
| 1 | e |
| 1 | n |
| 1 | g |
| 2 | d |
| 2 | e |
| 3 | p |
| 3 | r |
| 4 | y |
| 4 | a |
| 4 | h |
| 5 | o |

FIG. 14

TABLE : url_title   ~ 414

| _parent UNIQUE | url | title |
|---|---|---|
| 20 | ggg | google |

414a

TABLE : tags

| _parent | tags |
|---|---|
| 20 | goo |
| 20 | gle |

414b

TABLE : bookmarks_user_comment   414c

| _parent | _id UNIQUE AUTO_INCREMENT | user | comment |
|---|---|---|---|
| 20 | 0 | userA | search engine |
| 20 | 1 | userB | default program |

TABLE : bookmarks.tags_tag

| _parent | _id UNIQUE AUTO_INCREMENT | tag |
|---|---|---|
| 0 | 0 | search |
| 0 | 1 | engine |
| 1 | 2 | default |
| 1 | 3 | program |

414d

TABLE : bookmarks.tags.chars   414e

| _parent | chars |
|---|---|
| 0 | s |
| 0 | e |
| 0 | a |
| 1 | e |
| 1 | n |
| 1 | g |
| 2 | d |
| 2 | e |
| 3 | p |
| 3 | r |

FIG. 15

TABLE : url_title  414a    414

| _parent UNIQUE | url | title |
|---|---|---|
| 20 | ggg | google |
| 30  T52 | yyy  T52 | yahoo  T53 |

TABLE : tags  414b

| _parent | tags |
|---|---|
| 20 | goo |
| 20 | gle |
| 30  T54 | yah  T54 |

TABLE : bookmarks_user_comment  414c

| _parent | _id UNIQUE AUTO_INCREMENT | user | comment |
|---|---|---|---|
| 20 | 0 | userA | search engine |
| 20 | 1 | userB | default program |
| 30  T55 | 2  T55 | userA  T56 | yahooooo  T57 |

TABLE : bookmarks.tags_tag  414d

| _parent | _id UNIQUE AUTO_INCREMENT | tag |
|---|---|---|
| 0 | 0 | search |
| 0 | 1 | engine |
| 1 | 2 | default |
| 1 | 3 | program |
| 2  T58 | 4  T58 | yah  T59 |
| 2  T63 | 5  T63 | ooo  T56 |

FIG. 16

TABLE : bookmarks.tags.chars  ~414e        ~414

| _parent | chars |
|---|---|
| 0 | s |
| 0 | e |
| 0 | a |
| 1 | e |
| 1 | n |
| 1 | g |
| 2 | d |
| 2 | e |
| 3 | p |
| 3 | r |
| 4  ~T60 | y  ~T60 |
| 4  ~T61 | a  ~T61 |
| 4  ~T62 | h  ~T62 |
| 5  ~T65 | o  ~T65 |

ICE PROCESSING APPARATUS, COMPUTER-READABLE RECORDING MEDIUM HAVING STORED THEREIN DATA CONVERSION PROGRAM, AND DATA CONVERSION METHOD

CROSS-REFERENCE TO RELATED APPLICATION

This application is based upon and claims the benefit of priority of the prior Japanese Patent Application No. 2014-032652, filed on Feb. 24, 2014, the entire contents of which are incorporated herein by reference.

FIELD

The present invention relates to an information processing apparatus, a computer-readable recording medium having stored therein a data conversion program, and a data conversion method.

BACKGROUND

FIG. 23 is a diagram that illustrates an example of the configuration of an information processing system 100, and FIG. 24 is a diagram that illustrates an example of the functional configuration of an application server 120 illustrated in FIG. 23. As illustrated in FIG. 23, the information processing system 100 includes: a plurality of application servers 120; a plurality of database (DB) servers 140; and a network switch 130 that connects the application servers 120 and the DB servers 140.

In the information processing system 100, as illustrated in FIG. 24, the application server 120 accesses a DB 141 managed by the DB server 140 using a database connection unit 122, thereby executing a predetermined application 121. As the DB 141 for which the application server 120 performs an access, in other words, an operation of inputting/outputting data or the like, a relational DB (RDB) that represents relations between data and a plurality of pieces of data in one or more tables is frequently used. The RDB, owing to its high penetration, has active operations for functional enhancements and bug corrections made by vendors, users, and the like of a management system (RDB management system; RDBMS) and is regarded as a DB having high performance and high stability.

The application 121 frequently uses a data model (data format) having a tree structure including a nested structure. Here, the data model is a data format used for the application 121 to access the DB 141 and defines the form of data handled by the application 121 in an access from the application to the DB 141. In a case where a data model having a tree structure is implemented using an RDB that handles data of a table form, a developer of the application 121 designs the data model in which a plurality of tables are associated with one another in a complicated manner. However, in a case where a plurality of tables are associated with one another in a complicated manner, it is difficult for a developer to recognize trees in a design stage of the application 121, and there are cases where the design, the update, and the like of the application 121 are difficult to perform easily.

On the other hand, a document DB (DDB) for which a data model having a tree structure including a nested structure can be easily handled is known. The DDB is a DB that is specialized on the application 121 side and allows a tree structure to be seen by a developer and the like so as to be handled as it is and enables intuitive design of a data model.

In addition, as related technology, a technology for an electronic transaction slip converting apparatus to convert electronic data interchange (EDI) slip data into RDB transaction data by using a conversion rule for converting the EDI slip data into an RDB format is known (for example, see Japanese Laid-open Patent Publication No. 09-319811).

Furthermore, as another related technology, a technology for generating a model of an object DB (ODB) and a model of an RDB and converting a set of ODBs into the RDB is known (for example, see Japanese National Publication of International Patent Application No. 11-504451).

Since the DDB has a product history shorter than the RDB, the introduction thereof is not popular, and bug corrections and the like thereof are not actively made. Thus, it is difficult to determine that the DDB has performance and stability superior to those of the RDB. For this reason, in a case where the DB server 140 uses the DDB, the performance of the application server 120 is expected to be higher than that of a case where the RDB is used. In addition, in a case where the application 121 does not allow any data error or any data loss or does not allow many data errors or a large amount of data loss, it is difficult to introduce the DDB.

On the other hand, in a case where a tree structure including a nested structure (hereinafter, simply referred to as a tree structure) is to be represented using the RDB, one of the following techniques (a) and (b) may be considered.

(a) The data format of the tree structure is converted into a format of a single table.

(b) The data format of the tree structure is converted into a format of a plurality of tables.

In the technique (a) described above, when data having a tree structure is converted into single-table-format data, and the converted data is stored in the RDB, due to the nested structure, duplications of the content of data occur, and the data size of the RDB increases.

In addition, in the technique (b) described above, when data having a tree structure is converted into multiple-table-format data, the number of tables is increased, and accordingly, many tables are referred to at the time of referring from the application server 120. As a result, a large amount of the memory is consumed.

As above, in a case where the DDB that is suitable for the design, update, and the like of the application 121 is used as the DB 141, compared to the case of the DB 141 handling the RDB, there is a problem in that a decrease in the performance of the system or an increase in the introduction/operating cost may occur.

In addition, the technology for converting the EDI slip data into the RDB transaction data described above enables a conversion of data of a specific format into data of an RDB format, and it is difficult to convert data of a tree structure including various nested structures or various hierarchies into data of the RDB format in an adaptive manner.

SUMMARY

An information processing apparatus according to an embodiment includes a processor. The processor converts data of a hierarchical structure including a nested structure inputted in a first data format into a second data format representing the data using a plurality of tables and stores the converted data into a storing unit. In addition, the processor generates, for each information element of the inputted data, a first table including a value of the information element, and associates each of a plurality of the first tables with a corresponding another first table according to the nested structure of the data. In addition, the processor generates a second table by integrating the first tables that satisfy a predetermined condition among the plurality of the first tables.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram that illustrates an example in which a document is represented in a JSON format in a DDB;

FIG. 10 is a diagram that illustrates an example of first tables generated by a generation unit illustrated in FIG. 6;

FIG. 11 is a diagram that illustrates an example of first tables generated by the generation unit illustrated in FIG. 6;

FIG. 12 is a diagram that illustrates an example of second tables generated by an integration unit illustrated in FIG. 6;

FIG. 13 is a diagram that illustrates an example of a second table generated by the integration unit illustrated in FIG. 6;

FIG. 14 is a diagram that illustrates an example of second tables updated by an update unit illustrated in FIG. 6;

FIG. 15 is a diagram that illustrates an example of the second tables after the update illustrated in FIG. 14;

FIG. 16 is a diagram that illustrates an example of the second table after the update illustrated in FIG. 14;

DESCRIPTION OF EMBODIMENTS

Hereinafter, embodiments will be described with reference to the drawings.

[1] Embodiment

[1-1] Information Processing System

Figure 1:
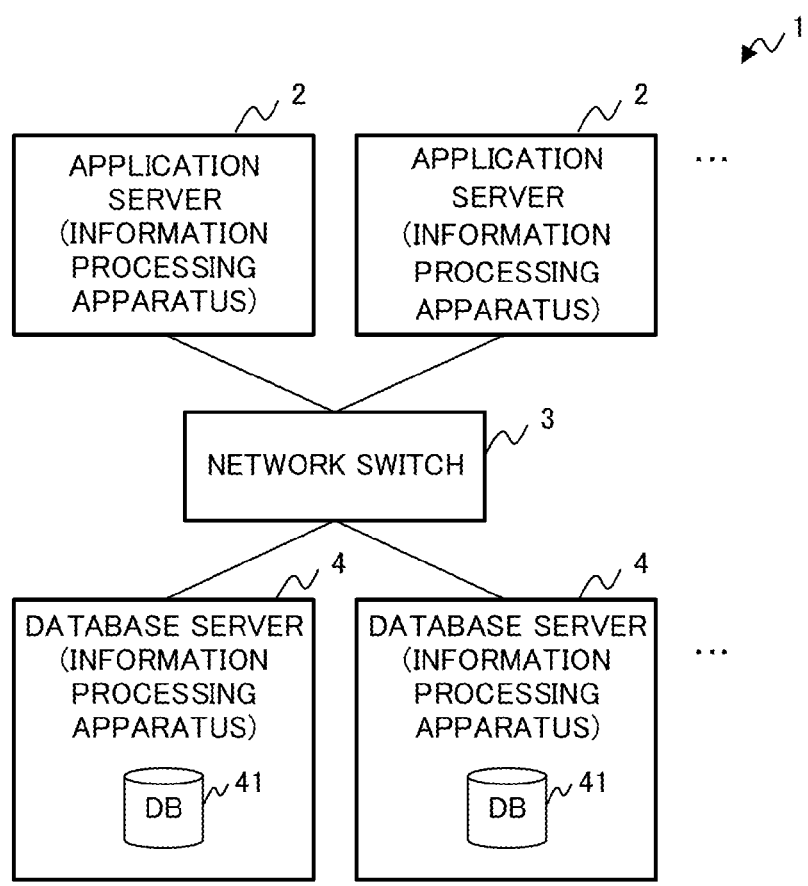
FIG. 1 is a diagram that illustrates an example of the configuration of an information processing system according to an embodiment.

FIG. 1 is a diagram that illustrates an example of the configuration of an information processing system 1 according to an embodiment. As illustrated in FIG. 1, the information processing system 1 includes: a plurality of application servers (hereinafter, simply referred to as application servers) 2; a network switch 3; and a plurality of database (DB) servers 4.

In FIG. 1, while the information processing system 1 is illustrated to include the plurality of application servers 2 and the plurality of DB servers 4, the present invention is not limited thereto. Thus, the information processing system 1 may be configured to include one application server 2 and one DB server 4. In such a case, the network switch 3 may be omitted. In addition, in FIG. 1, while all the application servers 2 and all the DB servers 4 are illustrated to belong to the same network, the present invention is not limited thereto, but a hierarchical structure may be employed in the network.

The network switch 3 is a device that interconnects the application servers 2 and the DB servers 4 in a communicable manner. As examples of the network switch 3, there are an L3 (Layer 3) switch, a switching hub, and the like.

The application server 2 accesses the DB server 4 through the network switch 3, thereby executing a predetermined application using the database (DB) 41.

The DB server 4 is a server that manages (stores) the DB 41 used by the application servers 2. As the DB 41, for example, an RDB having high performance and high stability may be used.

As each of the application server 2 and the DB server 4, for example, an information processing apparatus such as a personal computer (PC) or a server may be used.

[1-2] Example of Hardware Configuration of Application Server and DB Server

Figure 2:
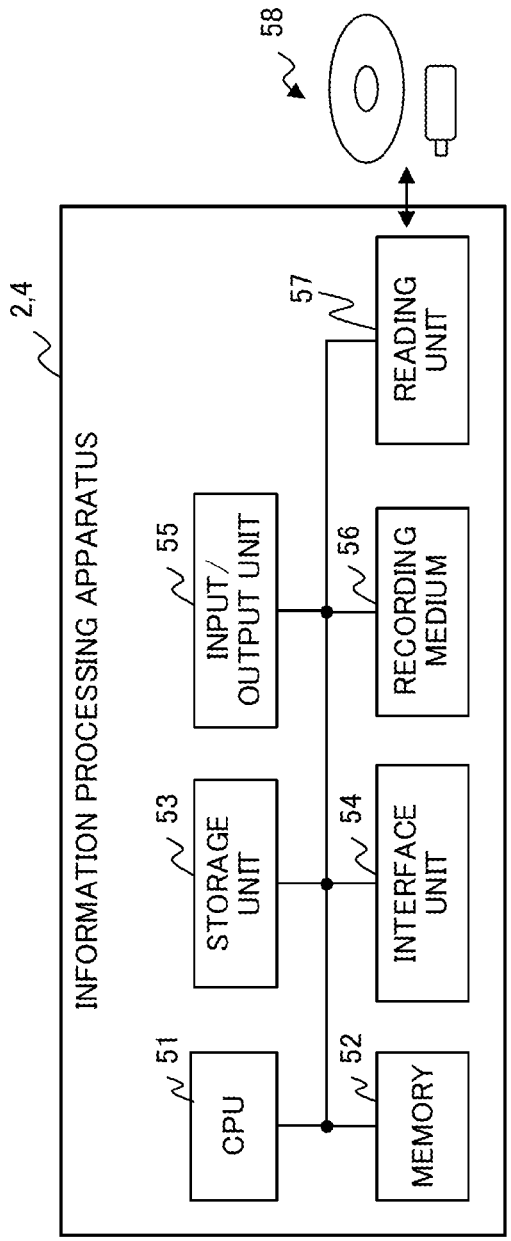
FIG. 2 is a diagram that illustrates an example of the hardware configuration of an application server and a database (DB) server illustrated in FIG. 1.
Figure 3:
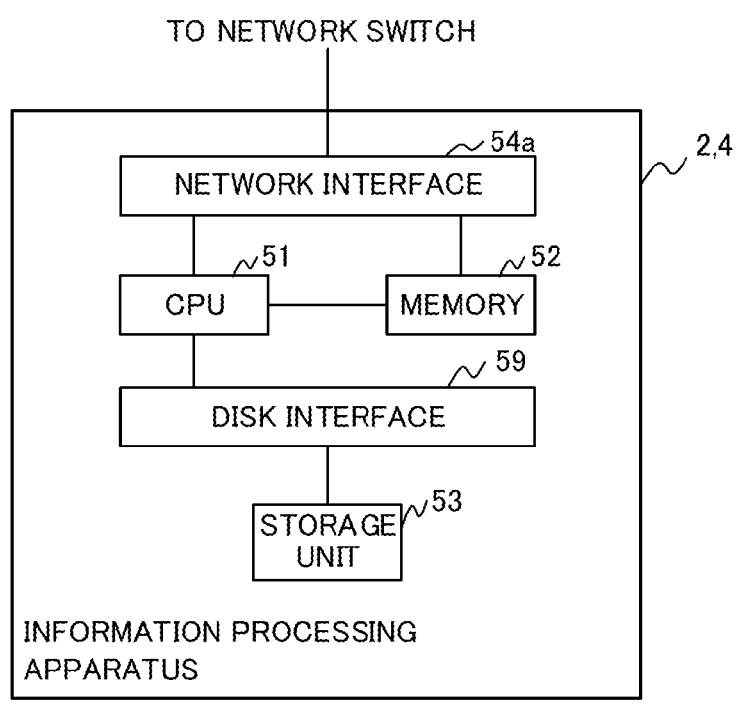
FIG. 3 is a diagram that illustrates a connection example of the hardware illustrated in FIG. 2.

Here, an example of the hardware configuration of each of the application server 2 and the DB server 4 according to an embodiment will be described with reference to FIGS. 2 and 3. FIG. 2 is a diagram that illustrates an example of the hardware configuration of the application server 2 and the DB server 4 illustrated in FIG. 1, and FIG. 3 is a diagram that illustrates a connection example of the hardware illustrated in FIG. 2.

An information processing apparatus as each of the application server 2 and the DB server 4, as illustrated in FIG. 2, may be configured to include: a central processing unit (CPU) 51, a memory 52; a storage unit 53; an interface unit 54; an input/output unit 55, a recording medium 56; and a reading unit 57. The plurality of the application servers 2 and the plurality of the DB servers 4 illustrated in FIG. 1 may have the same hardware, and thus, hereinafter, the hardware of one application server 2 or one DB server 4 will be representatively described.

The CPU 51 is connected to corresponding blocks 52 to 57 illustrated in FIG. 2 and is an arithmetic processing device (processor) that performs various control and arithmetic operations. The CPU 51 executes a program stored in the memory 52, the storage unit 53, the recording medium 56 or 58, a read only memory (ROM) not illustrated in the figure, or the like, thereby realizing various functions of the application server 2 or the DB server 4.

The memory 52 is a memory device that stores various kinds of data and programs. When a program is to be executed, the CPU 51 stores and expands data and the program in the memory 52. As the memory 52, for example, a volatile memory such as a random access memory (RAM) may be used.

The storage unit 53 is hardware that stores various kinds of data, programs, and the like. As the storage unit 53, for example, various devices including a magnetic disk device such as a hard disk drive (HDD), a semiconductor drive device such as a solid state drive (SSD), and a non-volatile memory such as a flash memory may be used. In addition, as the storage unit 53, a plurality of devices may be used, and redundant arrays of inexpensive disks (RAID) may be configured by such devices.

The interface unit 54 controls a connection and communication with a network (not illustrated in the figure) or any other server 2 or 4 and the like in a wired or wireless manner. The interface unit 54 may include a network interface 54a illustrated in FIG. 3. As the interface unit 54, for example, a local area network (LAN), a fibre channel (FC), or an adaptor that is in compliance with InfiniBand or the like may be used.

The input/output unit 55 may include at least one of an input device such as a mouse or a keyboard and an output device such as a display or a printer. For example, the input/output unit 55 is used by a user, a supervisor, or the like of the application server 2 or the DB server 4 for various operations.

The recording medium 56, for example, is a memory device such as a flash memory or a ROM and can store various kinds of data and programs therein. The reading unit 57 is a device that reads out data or a program stored in a computer-readable recording medium 58. In at least one of the recording media 56 and 58, a data conversion program that realizes all or some of various functions of the application server 2 or the DB server 4 according to this embodiment may be stored. For example, the CPU 51 may expand a program read from the recording medium 56 or a program read from the recording medium 58 through the reading unit 57 in a memory device such as the memory 52 and execute the program. In this way, a computer (including the CPU 51, the information processing apparatus, and various terminals) can realize the functions of the application server 2 or the DB server 4 described above.

In addition, as the recording medium 58, for example, an optical disk such as a flexible disk, a compact disk (CD), a digital versatile disc (DVD), or the Blu-ray disc or a flash memory such as a universal serial bus (USB) memory or an SD card may be used. Examples of the CD include a CD-ROM, a CD-recordable (CD-R), and a CD-rewritable (CD-RW). In addition, examples of the DVD include a DVD-ROM, a DVD-RAM, a DVD-R, a DVD-RW, a DVD+R, and DVD+RW.

The blocks 51 to 57 described above are interconnected to be communicable with one another through a bus. For example, the CPU 51 and the storage unit 53 are interconnected through a disk interface 59 (see FIG. 3). Here, the hardware configuration of the application server 2 or the DB server 4 described above is an exemplary configuration. Thus, an increase/decrease (for example, addition or omission of an arbitrary block), division, integration of an arbitrary combination, addition/omission of a bus, and the like of the hardware within the application server 2 or the DB server 4 may be performed as is appropriate. In addition, the hardware of the application server 2 and the hardware of the DB server 4 may be integrated together. Furthermore, between the application servers 2, between the DB servers 4, or between the application server 2 and the DB server 4, another hardware configuration may be employed.

[1-3] DB Server

Figure 4:
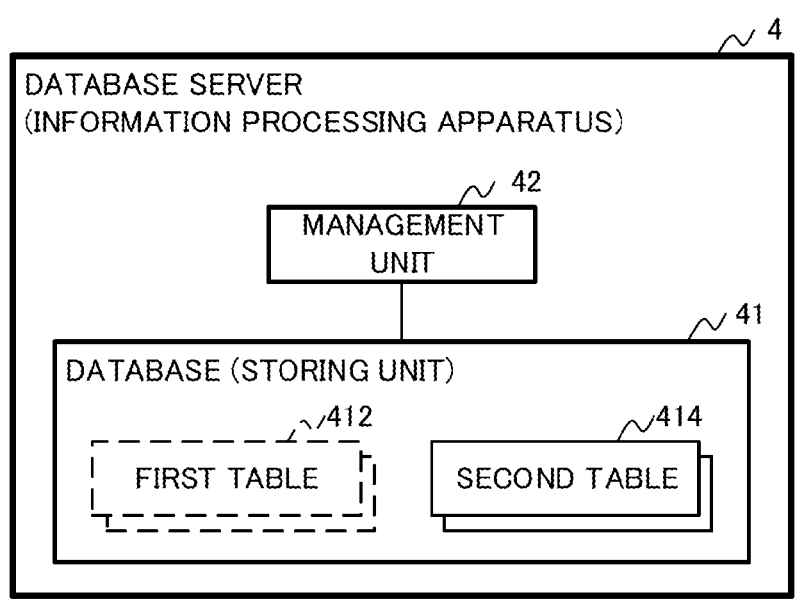
FIG. 4 is a diagram that illustrates an example of the functional configuration of the DB server illustrated in FIG. 1.

Next, the DB server 4 will be described. FIG. 4 is a diagram that illustrates an example of the functional configuration of the DB server 4 illustrated in FIG. 1. As illustrated in FIG. 4, the DB server 4 includes a management unit 42 in addition to the DB 41 described above as a functional block.

The DB 41 is a database used by an application 21 and is an example of a storing unit that stores various kinds of data. As the DB 41, as described above, an RDB having high performance and high stability may be used. As illustrated in FIG. 4, the DB 41 stores one or more first tables 412 and one or more second tables 414. The first table 412 is a table that is generated in the process of a data model conversion performed by a data model conversion engine 23 to be described later. Thus, after the data model conversion is performed, the DB 41 may store at least the second tables 414 without storing the first tables 412. For this reason, in FIG. 4, blocks of the first tables 412 are denoted by broken lines. The first table 412 and the second table 414 will be described later in detail.

The management unit 42 manages accesses to the DB 41 from the application servers 2. In the management of accesses, various processes such as generation, update, deletion, or reference of the first table 412 or the second table 414 in the DB 41 in response to a request from the application server 2 may be included.

The DB 41 included in the DB server 4, for example, is realized by at least one of the memory 52 and the storage unit 53 described above, and the function of the management unit 42, for example, is realized by the above-described CPU 51 executing a program expanded in the memory 52.

[1-4] Application Server

Figure 5:
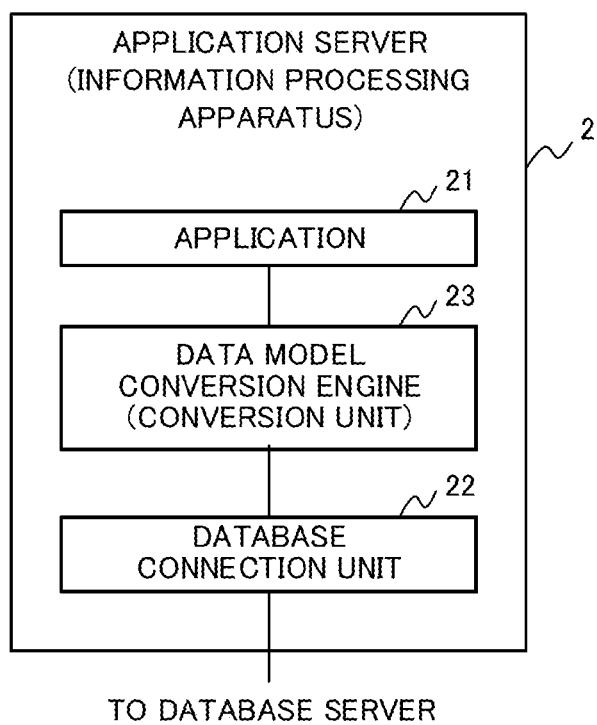
FIG. 5 is a diagram that illustrates an example of the functional configuration of the application server illustrated in FIG. 1.

Next, the application server 2 will be described. FIG. 5 is a diagram that illustrates an example of the functional configuration of the application server 2 illustrated in FIG. 1. As illustrated in FIG. 5, the application server 2 includes: the application 21; the DB connection unit 22; and the data model conversion engine 23 as functional blocks. The function of each of the application 21, the DB connection unit 22, and the data model conversion engine 23, for example, is realized by the above-described CPU 51 executing a program expanded in the memory 52.

The application 21 is software that realizes a predetermined function by accessing the DB 41 (see FIG. 4) using a data model (a data format; a first data format) having a tree (hierarchical) structure including a nested structure. The application 21, for example, may use a DDB such as a Mongo DB.

For example, when the DB 41 is determined to be accessed in a service to be provided, the application 21 issues various access requests for accessing the DB 41 to the data model conversion engine 23. Examples of such requests include a document (object) storage/update request (write request) for the DB 41 and a document referring request (read request) for the DB 41. The application 21 provides a service by using a response to the storage/update request or the referring request from the data model conversion engine 23.

The DB connection unit 22 makes an access to the DB server 4. More specifically, the DB connection unit 22 provides the data model conversion engine 23 with an application programming interface (API) of a data model of an RDB (a table form; a second data format) managed by the DB server 4. Then, the DB connection unit 22 makes various accesses to the DB server 4 in response to a storage/update request or a referring request according to the data model conversion engine 23.

The data model conversion engine (conversion unit) 23 is disposed between the application 21 and the DB connection unit 22 and performs a conversion between a data model of a DDB handled by the application 21 and a data model of an RDB handled by the DB server 4. For example, the data model conversion engine 23 may convert data having a hierarchical structure including a nested structure, which is inputted in the first data format, into data of the second data format representing the data using a plurality of tables and store the converted data in the DB 41.

[1-5] Data Model Conversion Engine

Figure 6:
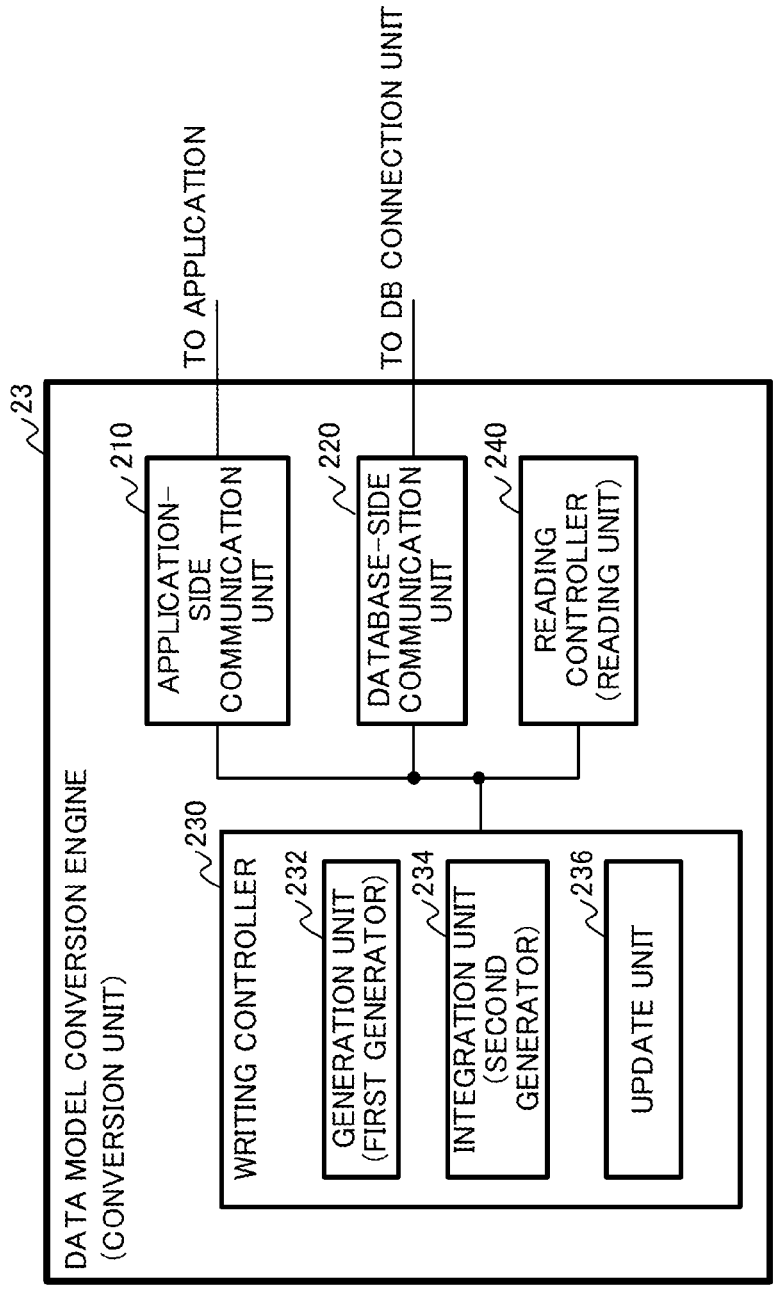
FIG. 6 is a diagram that illustrates a detailed example of the configuration of a data model conversion engine illustrated in FIG. 5.

Hereinafter, the data model conversion engine 23 will be described in detail. FIG. 6 is a diagram that illustrates a detailed example of the configuration of the data model conversion engine 23 illustrated in FIG. 5. As illustrated in FIG. 6, the data model conversion engine 23 includes: an application-side communication unit 210; a DB-side communication unit 220; a writing controller 230; and a reading controller 240 as functional blocks.

The application-side communication unit 210 controls communication with the application 21.

For example, the application-side communication unit 210 provides the application 21 with an API of a data model of a DB (for example, a DDB) other than the RDB that is the DB 41 managed by the DB server 4. In addition, the application-side communication unit 210 receives access requests such as the storage/update request or the referring request described above from the application 21 through the API.

More specifically, when the API is called from the application 21, the application-side communication unit 210 determines whether the API relates to the storage/update request or the referring request. Then, in a case where the called API relates to the storage/update request as a result of the determination, the application-side communication unit 210 outputs the storage/update request to the writing controller 230. On the other hand, in a case where the called API relates to the referring request, the application-side communication unit 210 outputs the referring request to the reading controller 240.

In addition, the application-side communication unit 210 outputs a response to the storage/update request to the application 21 based on a result of storage/update of a document (object) for the DB 41 that is performed by the writing controller 230. Furthermore, the application-side communication unit 210 outputs a response to the referring request to the referring request to the application 21 together with reference data (return value) acquired from the DB 41 based on a result of the referring to an object, which is performed by the reading controller 240, acquired from the DB 41.

Here, as the API with which the application 21 is provided by the application-side communication unit 210, an object (may include an array) of an object-oriented language such as Java (registered trademark) may be preferably transferred, but the present invention is not limited thereto. For example, the application-side communication unit 210 may provide the application 21 with an API that transfers a character string of a JSON (JavaScript object notation) format that is a format for converting the structure of an object into character strings.

As above, as the API with which the application 21 is provided, any API may be used as long as it can be carried in a communication path without losing information and can represent a structured format such as a tree structure including a nested structure. As another example, the application 21 may be provided with an API that transfers binary data of a binary JSON (BSON; binary-type JSON having high transmission efficiency) format or the like.

Hereinafter, for the simplification of description, the application-side communication unit 210 is assumed to provide an API that transfers a character string of the JSON type to the application 21.

Figure 8:
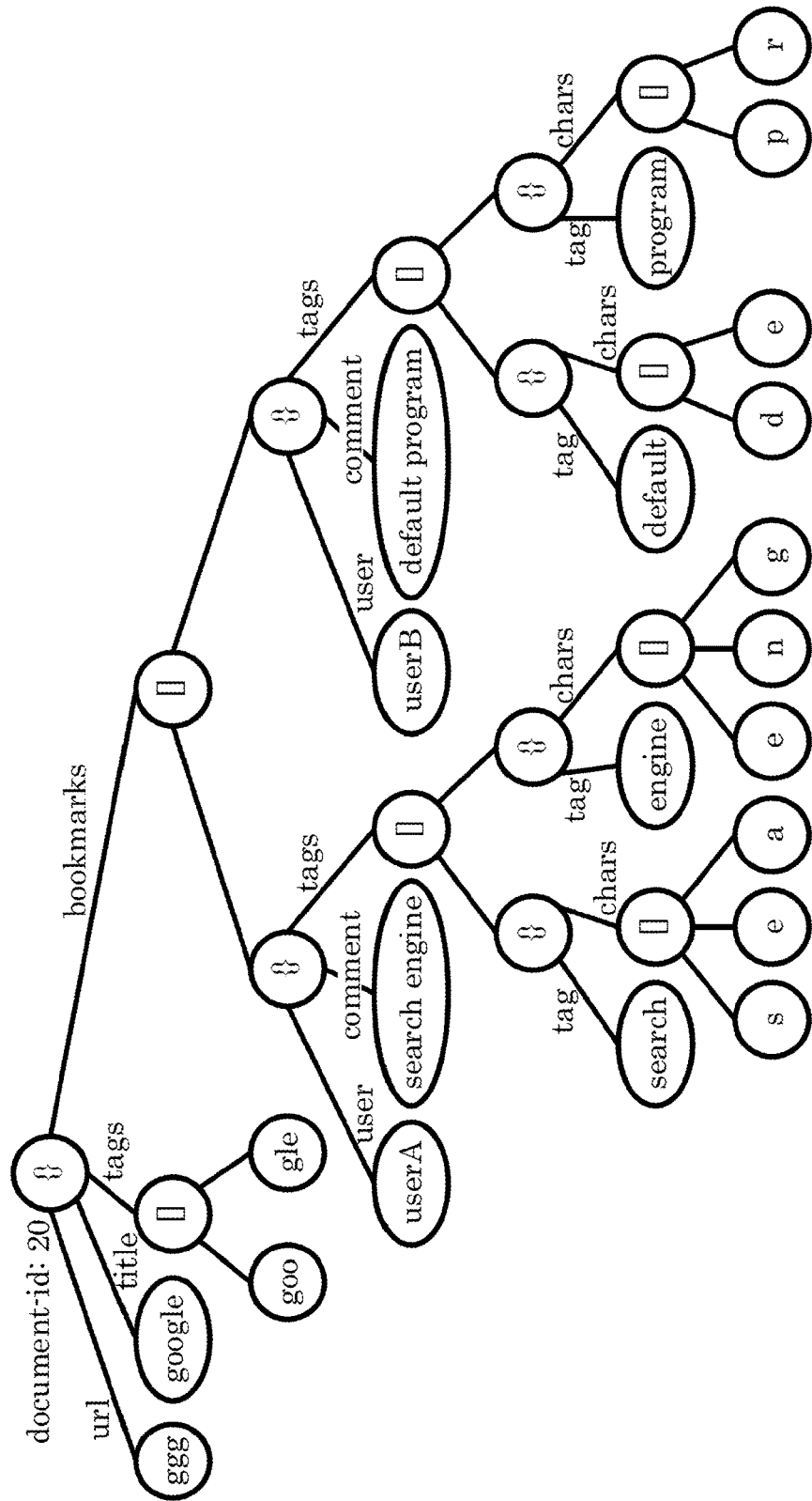
FIG. 8 is a diagram that illustrates an example in which the document illustrated in FIG. 7 is represented in a graphic form.
Figure 9:
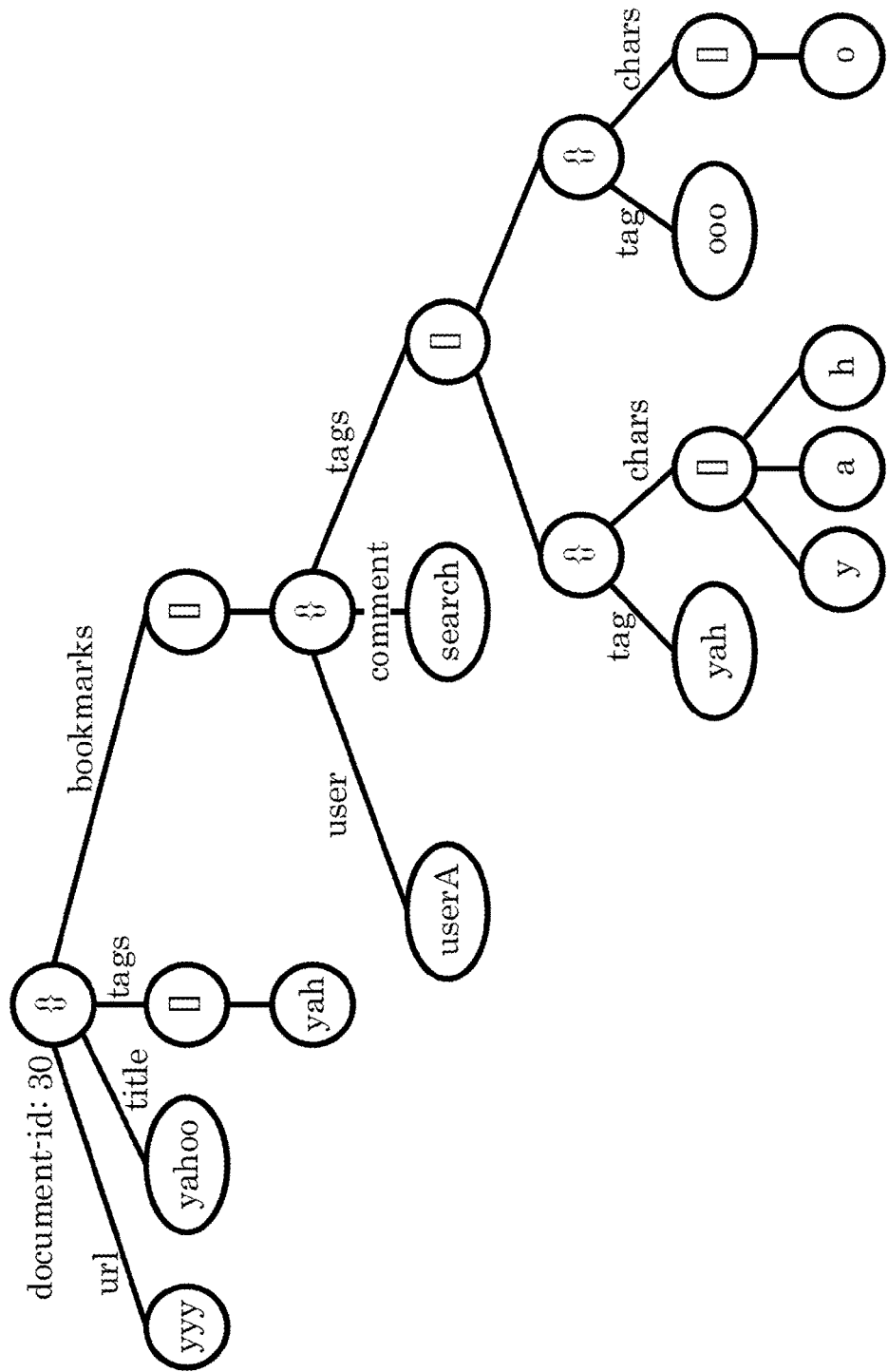
FIG. 9 is a diagram that illustrates an example in which the document illustrated in FIG. 7 is represented in a graphic form.

FIG. 7 is a diagram that illustrates an example in which a document is represented in the JSON format in a DDB, and FIGS. 8 and 9 are diagrams that illustrate examples in which the document illustrated in FIG. 7 is represented in a graphic form. In the description presented below, a document (object) and an array may be respectively represented as a map and a list.

FIG. 7 illustrates an example in which structured data is stored in each of two documents of "document-id: 20" and "document-id: 30". In the JSON format illustrated in FIG. 7, a graphic notation of "document-id: 20" illustrated in FIG. 8, and a graphic notation of "document-id: 30" illustrated in FIG. 9, "{ }" represents a map having a child element (subordinate element), and "[ ]" represents a list having a child element. A map, as illustrated in FIGS. 8 and 9, includes a character string on a side of each graph connected to a child element, and this character string is a key (information element). In addition, as illustrated in FIGS. 8 and 9, a vertex of each tree includes a map, a list, or any other character string. A character string other than a map and a list represents a value.

For example, child elements of a vertex (map) of the highest order of "document: 20" illustrated in FIG. 8 are a value "ggg" having "url" as a key, a value "google" having "title" as a key, a list (having child elements) having "tags" as a key, and a list (having child elements) having "bookmarks" as a key. Here, each child element of a list does not have a key. For example, child elements of the list having "tags" as the key described above are values "goo" and "gle". In addition, a child element of the list having "bookmarks" as the key is a map (a map having a key "user", a key "comment", and a list that has a map as child elements) that forms a multiple-level nested structure.

As illustrated in FIGS. 7 to 9, in a case where an API of the JSON format is provided, the application 21 can accurately convert a document (object) having a tree structure including a nested structure into character strings of the JSON format. Accordingly, the application 21 can convert an object into the JSON format without losing information included in the object to be processed by a program thereof and can convert character strings represented in the JSON format into an object to be processed by the program thereof without losing the information included therein. This similarly applies to a case where an API of the BSON format instead of the JSON format is provided.

The DB-side communication unit 220 controls communication with the DB 41 side, in other words, the DB connection unit 22 and communicates with the DB server 4 by using the API provided by the DB connection unit 22 as described above.

More specifically, the DB-side communication unit 220 outputs a storage/update request for storing/updating tables in the DB 41 to the DB connection unit 22 in response to a request from the writing controller 230. In addition, the DB-side communication unit 220 outputs a referring request for referring to a table from the DB 41 to the DB connection unit 22 in response to a request from the reading controller 240.

The writing controller 230, in response to a storage/update request inputted from the application-side communication unit 210, converts a document relating to the storage/update request into the table form and outputs the converted document to the DB-side communication unit 220 so as to be stored in the DB 41. In addition, the writing controller 230 outputs a storage/update result to the application-side communication unit 210.

The reading controller 240, in response to a referring request inputted from the application-side communication unit 210, acquires data corresponding to a document relating to the referring request from the second table 414 stored inside the DB 41 through an access using the DB-side communication unit 220 and generates the document. Then, the reading controller 240 outputs a referring result with the generated document being set as a return value of the referring request to the application-side communication unit 210.

In addition, the data model conversion engine 23 operates at timing when the API is called by the application 21, in other words, at timing when an access request is issued.

Hereinafter, detailed operations of the writing controller 230 and the reading controller 240 will be described.

[1-6] Writing Controller

As illustrated in FIG. 6, in order to perform a process corresponding to an object relating to a storage/update request or data included inside the object, the writing controller 230 includes a generation unit 232, an integration unit 234, and an update unit 236.

Here, when an storage/update request is inputted, the writing controller 230 determines whether or not a second table 414 relating to the inputted document has been generated in the DB 41 through the DB-side communication unit 220. In a case where the second table 414 has not been generated in the DB 41, the writing controller 230 performs the processes of the generation unit 232 and the integration unit 234. On the other hand, in a case where the second table 414 has been generated, the writing controller 230 performs the process of the update unit 236. Hereinafter, the processes of the generation unit 232, the integration unit 234, and the update unit 236 according to the determination result will be described.

[1-6-1] Case where Second Table has not been Generated in DB

First, the processes of the generation unit 232 and the integration unit 234 that are performed in a case where the second table 414 has not been generated in the DB 41 will be described.

[1-6-1-1] Generation Unit

The generation unit 232 internally performs a conversion of a data model for an object relating to the inputted storage/update request, and thereby generating one or more first tables 412. More specifically, the generation unit 232 converts the inputted object having a tree structure of the JSON format into a data model of an RDB managed by the DB server 4, in other words, into a table form for each key under a first condition described below. Then, the generation unit 232 outputs the converted table to the DB server 4 through the DB-side communication unit 220 and stores the converted table as one or more first tables 412.

More specifically, the generation unit 232 searches the inputted document for keys, for example, in order of description of character strings (in order from the vertex of a tree toward a child element) and generates a table that includes a parent element (higher-order element) name and a value according to the first condition defined in (i) to (iv) as below for each key. In addition, the generation unit 232 sets a character string acquired by combining the table name of the generated first table 412 with a character string representing a hierarchy from the vertex of the tree to the key of the table, for example, a character string acquired by combining up to the key from the highest-order with "." being interposed therebetween.

(i) Case Where Key Directly Has Value: The generation unit 232 generates a table that has two columns of "parent (having a UNIQUE attribute)" and "value".

(ii) Case Where Key Has List That Directly Has Value: The generation unit 232 generates a table that has two columns of "parent" and "value".

(iii) Case Where Key Has Map: The generation unit 232 does not generate a table for the key. In addition, the key for which any table is not generated, when the generation unit 232 generates a table for a key having a value in a lower-order map of the key, is included in a table name (a character string representing a hierarchy) of the table.

(iv) Case Where Key Has List That Has Map: The generation unit 232 generates a table that has two columns of "parent" and "id (having a UNIQUE attribute and an AUTO_INCREMENT attribute)". For example, the generation unit 232 generates "id's", which do not overlap each other, in ascending order.

Here, an example of a specific technique for determining the first condition of (i) to (iv) described above that is performed by the generation unit 232 will be described for a document of the JSON format as illustrated in FIG. 7 as an example.

First, the generation unit 232 acquires an ID of a document (map) that is a conversion target. For example, the generation unit 232 extracts a character string (information) "document-id: xx {" ("xx" is an arbitrary character string) from the start of the document to the start of the first map and memorizes "parent=xx" in the memory 52 or the like.

Next, the generation unit 232 extracts a predetermined character string (information) from a prior extraction position until predetermined information used for identifying a key and a structure of the key is detected. Here, examples of the predetermined information include "," (comma), "{" (start of a map), "document-id:" (start of a next document), and the last "}" within a document (data). Then, the generation unit 232 determines whether a key relating to the extracted character string corresponds to one of (i) to (iv) described above as follows.

(A) In Case Where Tail of Extracted Character String Is "," or Last "}" Within Document (Data)

(A-1) In (A), In Case Where "[" (Start of List) Is Included In Extracted Character String: The generation unit 232 determines that the key is a "key directly having a list that directly has a value" (corresponding to (ii) described above).

(A-2) In Case Not Corresponding to (A-1) AND In Case Where Key Included in Character String That Has Been Previously Extracted Is Determined To "Have List Directly Having Value"

(A-2-1) In (A-2), In Case Where List Is Closed at Character String That Has Been Previously Extracted: The generation unit 232 determines that the key corresponds to a "key directly having a value" (corresponding to (i) described above).

(A-2-2) In Case Not Corresponding to (A-2-1): The generation unit 232 determines that the key corresponds to a "key that has a list directly having a value" (corresponding to (ii) described above).

(A-3) In Case Not Corresponding to (A-2): The generation unit 232 determines that the key corresponds to a "key directly having a value" (corresponding to (i) described above).

(B) In Case Where Tail of Extracted Character String Is "{"

(B-1) In (B), In Case Where "[" (Start of List) Is Included In Extracted Character String: The generation unit 232 determines that the key is a "key that has a list having a map" (corresponding to (iv) described above).

(B-2) In Case Not Corresponding to (B-1) AND In Case Where Key Included in Character String That Has Been Previously Extracted Is Determined To "Have List Directly Having Value"

(B-2-1) In (B-2), In Case Where List Is Closed at Character String That Has Been Previously Extracted: The generation unit 232 determines that the key corresponds to a "key having a map" (corresponding to (iii) described above).

(B-2-2) In Case Not Corresponding to (B-2-1): The generation unit 232 determines that the key corresponds to a "key that has a list having a map" (corresponding to (iv) described above).

In addition, in (i) to (iv) described above, in "parent" of a table to be generated, the generation unit 232 sets a value "xx" of "document-id" in a case where the key has the highest order and sets "id" included in the table corresponding to the higher-order key in a case where the key has not the highest order. In addition, the generation unit 232 stores the value of the key in "value" of the table to be generated.

As above, the generation unit 232, for a plurality of keys included in the inputted document, generates/updates corresponding tables 412a to 412i (first tables 412) and stores/updates the tables in the DB 41 through the DB-side communication unit 220. At this time, the generation unit 232 sets reference information of the other first tables 412 in columns corresponding to the types of keys in a plurality of the first tables 412, thereby associating each of the plurality of the first tables 412 with the other first tables 412 corresponding thereto.

[1-6-1-2] Integration Unit

When the generation/update of the plurality of the first tables 412 in the DB 41 that is performed by the generation unit 232 is completed, the integration unit 234 integrates tables 412a to 412i that can be integrated into one or more second tables 414. More specifically, the integration unit 234 integrates a group of first tables 412 that satisfy a second condition described below among the plurality of the first tables 412 into a second table 414.

For example, in a case where two or more of the first tables 412 among the plurality of the first tables 412 satisfy both (I) and (II) described below, the integration unit 234 determines that the two or more of the first tables 412 satisfy the second condition. Then, the integration unit 234 integrates the two or more of the first tables 412 into one second table 414.

(I) Hierarchies to which First Tables 412 Belong Have Predetermined Relation: More specifically, two or more of the first tables 412 are regarded to be positioned at the same hierarchy. Furthermore specifically, two or more of the first tables 412 satisfy the following (I-1) or (I-2).

(I-1) In Case Where All Tables Are Tables Generated Based On "Keys Directly Having Values": The tables are generated based on mutually-different keys that belonging to the same map.

(I-2) In Case Where Tables Are Generated Based On "Key Directly Having Value" and "Key Having List That Has Map", Respectively: The "key directly having a value" is included in a list of the "key having the list that has a map".

(II) Structures of Two or More of First Tables 412 Have Predetermined Relation: More specifically, two or more of the first tables 412 can be regarded to have the same structure, and further more specifically, two or more of the first tables 412 satisfy one of the following (II-1) to (II-3).

(II-1) All Tables Are Generated Based on "Key Directly Having Value"

(II-2) All Tables Are Generated Based on "Key Having List That Has Map"

(II-3) Tables Are Generated Based on "Key Directly Having Value" and "Key Having List That Has Map", Respectively In addition, the integration unit 234 sets a character string acquired by combining character strings representing the hierarchies of the two or more of the first tables 412 determined to satisfy the second condition, for example, a character string acquired by combining a common portion and a non-common portion of the table names of the first tables 412 together with "_" being interposed therebetween in the table name of the second table 414. In addition, the integration unit 234 changes the column names of "_parent" and "_id" of the first tables 412 to "parent" and "id" and sets the changed column names in the second table 414. The reason for this is to avoid overlapping with the names of the keys. In addition, the integration unit 234 changes the column name of "value" of each first table 412 to the name of the key and sets the changed column name in the second table 414.

Here, the integration unit 234 may generate a second table 414 based on one of the first tables 412 among the group of the two or more of the first tables 412 that can be integrated. In such a case, the integration unit 234 may change the table name and the column name of the first table 412 and add contents of the other first tables 412 of the group to the first table 412. Alternatively, the integration unit 234 may newly generate a second table 414 by integrating the contents of the first tables 412 of the group. In any case, in order to secure the storage area of the DB 41, it is preferable that the integration unit 234 deletes the first tables 412 of which the contents are included in the second table 414.

In addition, while first tables 412 determined not to satisfy the second condition are not integrated, the integration unit 234 changes the column names of the first tables 412 as well. In description presented below, for the convenience of the description, the first tables 412, for which integration is not performed, having the column names changed will be represented also as the second tables 414.

As above, the integration unit 234 integrates the group of the first tables 412 satisfying the second condition among the plurality of the first tables 412 as the second table 414 that is suitable for the RDB handled by the DB server 4.

According to the integration unit 234 described above, the first tables 412 of which the hierarchies to which the keys belong in the hierarchical structure and the types of keys have predetermined relation can be integrated together among the plurality of the first tables 412. Accordingly, the integration unit 234 can easily specify the first tables 412 to be integrated together based on the predetermined relation (second condition).

In addition, according to the integration unit 234, based on the table names of the plurality of the first tables 412, the first tables 412 of which the hierarchies to which the keys belong have predetermined relation can be detected. Furthermore, based on the columns corresponding to the types of keys in the plurality of the first tables 412, the integration unit 234 can detect the first tables 412 of which the types of keys have predetermined relation. In this way, in the integration process, the integration unit 234 can determine integration/no-integration of the first tables 412 and the first tables 412 that are integration targets based on the information relating to the first tables 412 without referring to other information.

Thus, according to the integration unit 234, the speed of the conversion performed by the data model conversion engine 23 can be improved, whereby the performance of accesses to the DB 41 using the information processing system 1 can be improved.

[1-6-1-3] Specific Example of Process of Generation Unit and Integration Unit

Next, specific examples of the processes of the generation unit 232 and the integration unit 234 described above will be described with reference to FIGS. 10 to 13. FIGS. 10 and 11 are diagrams that illustrate examples of the first tables 412 generated by the generation unit 232 illustrated in FIG. 6, and FIGS. 12 and 13 are diagrams that illustrate examples of the second tables 414 generated by the integration unit 234 illustrated in FIG. 6.

In the examples illustrated in FIGS. 10 and 11, it is assumed that documents (maps) to be converted by the generation unit 232 are two documents of "document-id: 20" and "document-id: 30" illustrated in FIG. 7. In addition, in the examples illustrated in FIGS. 12 and 13, the integration unit 234 is assumed to generate second tables 414 based on the tables 412a to 412i illustrated in FIGS. 10 and 11. In the tables 412a to 412i illustrated in FIGS. 10 and 11, reference signs starting with "T" attached to table names, column names, and each record represent the processing sequence of generation of the first tables 412 or addition of a record that is performed by the generation unit 232. In addition, while this processing sequence corresponds to the order of character strings of an inputted document, the processing sequence is not limited thereto.

First, the process of the generation unit 232 will be described.

First, the generation unit 232, as an ID of a document (map) that is a conversion target, extracts "document-id: 20 {" and memorizes "parent=20" in the memory 52 or the like in Process T1 (not illustrated in the figure).

Next, the generation unit 232 extracts "url: "ggg"," and determines the key "url" is a "key directly having a value" based on the logic represented in (A-3) described above. Then, the generation unit 232 generates a table 412a, of which the name is "url", having two columns of "parent (having a UNIQUE attribute)" and "value" based on (i) included in the first condition. In addition, in the table 412a, the generation unit 232 stores "20" memorized in Process T1 in "parent" due to the key having the highest order and stores a value "ggg" of the key in "value" in Process T2.

In addition, for "title: "google",", the generation unit 232, similar to Process T2, determines that the key "title" is a "key directly having a value". Then, the generation unit 232 generates a table 412b, of which the name is "title", having two columns of "parent (having a UNIQUE attribute)" and "value". In addition, in the table 412b, the generation unit 232 stores "20" of "document-id" that is memorized in Process T1 in "parent" due to the key having the highest order and stores a value "google" of the key in "value" in Process T3.

Next, the generation unit 232 extracts "tags: ["goo"," and determines the key "tags" is a "key having a list that directly has a value" based on the logic represented in (A-1) described above. Then, the generation unit 232 generates a table 412c, of which the name is "tags", having two columns of "parent" not having a UNIQUE attribute and "value" based on (ii) included in the first condition. In addition, in the table 412c, the generation unit 232 stores "20" memorized in Process T1 in "parent" due to the key having the highest order and stores a value "goo" of the key in "value" in Process T4.

Next, the generation unit 232 extracts ""gle"]," and determines the key is a "key having a list that directly has a value" based on the logic represented in (A-2-2) described above. Here, the key of ""gle"]," is the key "tags" extracted in Process T4. Then, the generation unit 232, in the table 412c, of which the name is "tags", generated in Process T4, stores "20" memorized in Process T1 in "parent" due to the key having the highest order and stores a value "gle" of the key in "value" in Process T5.

Next, the generation unit 232 extracts "bookmarks: [{" and determines that the key "bookmarks" is a "key having a list that has a map" based on the logic represented in (B-1) described above. Then, the generation unit 232 generates a table 412d, of which the name is "bookmarks", having two columns of "parent" and "id (having a UNIQUE attribute and an AUTO_INCREMENT attribute)" based on (iv) included in the first condition. In addition, in the table 412d, the generation unit 232 stores "20" memorized in Process T1 in "parent" due to the key having the highest order and stores "0" that is automatically generated in "id" in Process T6.

In addition, for "user: "userA",", the generation unit 232, similar to Process T3, determines that the key "user" is a "key directly having a value". Then, the generation unit 232 generates a table 412e, of which the name is "bookmarks.user", having two columns of "parent (having a UNIQUE attribute)" and "value". In addition, in the table 412e, the generation unit 232 stores "0" of "id" generated in the table 412d corresponding to a parent element of the key "user" in "parent" due to the key having non-highest order and stores a value "userA" of the key "user" in "value" in Process T7.

In addition, for "comment: "search engine",", the generation unit 232, similar to Process T7, determines that the key "comment" is a "key directly having a value". Then, the generation unit 232 generates a table 412f, of which the name is "bookmarks.comment", having two columns of "parent (having a UNIQUE attribute)" and "value". In addition, in the table 412f, the generation unit 232 stores "0" of "id" generated in the table 412d corresponding to a parent element of the key "comment" in "parent" due to the key having non-highest order and stores a value "search engine" of the key "comment" in "value" in Process T8.

Next, for "tags: [{", similar to Process T6, the generation unit 232 determines that the key "tags" is a "key having a list that has a map". Then, the generation unit 232 generates a table 412g, of which the name is "bookmarks.tags", having two columns of "parent" and "id (having a UNIQUE attribute and an AUTO_INCREMENT attribute)". In addition, in the table 412g, the generation unit 232 stores "0" of "id" generated in the table 412d corresponding to a parent element of the key "tags" in "parent" due to the key having non-highest order and stores a value "0" that is automatically generated in "id" in Process T9.

In addition, for "tag: "search",", the generation unit 232, similar to Process T8, determines that the key "tag" is a "key directly having a value". Then, the generation unit 232 generates a table 412h, of which the name is "bookmarks.tags.tag", having two columns of "parent (having a UNIQUE attribute)" and "value". In addition, in the table 412h, the generation unit 232 stores "0" of "id" generated in the table 412g corresponding to a parent element of the key "tag" in "parent" due to the key having non-highest order and stores a value "search" of the key "tag" in "value" in Process T10.

In addition, for "chars: ["s",", the generation unit 232, similar to Process T4, determines that the key "chars" is a "key having a list that directly has a value". Then, the generation unit 232 generates a table 412i, of which the name is "bookmarks.tags.chars", having two columns of "parent" having no UNIQUE attribute and "value". In addition, in the table 412i, the generation unit 232 stores "0" of "id" generated in the table 412g corresponding to a parent element of the key "chars" in "parent" due to the key having non-highest order and stores a value "s" of the key "chars" in "value" in Process T11.

Also in Processes T12 to T44, the generation unit 232, for the tables 412a to 412i that have already been generated, similar to the process described above, updates the tables 412a to 412i by adding records.

Each time when a record is to be added to the table 412e, 412f, or 412i, the record is added to the table 412d or 412h corresponding to a parent element and automatically generates "id". Then, the automatically-generated "id" added to the table 412d or 412h corresponding to the parent element may be added in "parent" of the record to be added to the table 412e, 412f, or 412i.

In addition, in Process T29, when the last "}" within a document (data) of "document-id: 20" is detected, the generation unit 232 determines whether or not another document is included in the inputted storage/update request. In a case where another document (for example, "document-id: 30") is present, the generation unit 232, similar to Process T1, memorizes "parent=30" in the memory 52 or the like in Process T30 (not illustrated in the figure). Then, in Processes T31 to T44 that are processes in "document-id: 30", when a record is to be added to any one of the tables 412a to 412c of which the keys have the highest order, the generation unit 232 stores "30" memorized in Process T30 in "parent".

Next, the process of the integration unit 234 will be described.

The integration unit 234 sequentially extracts two tables from among the tables 412a to 412i generated by the generation unit 232, determines whether or not the extracted tables satisfy the second condition, and integrates a set (group) that satisfies the second condition into the second table 414 as illustrated in FIGS. 12 and 13.

For example, since both tables 412a and 412b illustrated in FIG. 10 are at the top level and are tables each being based on a "key directly having a value" (see (I-1) and (II-1) described above), the integration unit 234 determines that the tables satisfy the second condition. Then, the integration unit 234 integrates the tables 412a and 412b into one second table 414 (see the table 414a illustrated in FIG. 12). At this time, since there is no common portion in the table names of the tables 412a and 412b, the integration unit 234 sets a character string acquired by combining the table names of the tables 412a and 412b with " " interposed therebetween in the table name of the table 414a. In addition, as the column names of the table 414a, the integration unit 234 sets character strings acquired by changing a column name "parent" of the tables 412a and 412b to "_parent", changing a column name "value" of the table 412a to "url", and changing the column name "value" of the table 412b to "title".

In addition, since the first table 412 that is positioned at the same hierarchy and has the same structure is not present in the table 412c illustrated in FIG. 10, the integration unit 234 determines that the table 412c does not satisfy the second condition and does not integrate the table 412c. At this time, the integration unit 234 sets the table 412c as the second table 414 without changing the table name thereof (see the table 414b illustrated in FIG. 12). In addition, the integration unit 234 changes a column name "parent" of the table 412c to "_parent" and changes a column name "value" of the table 412c to "tags" as the column names of the table 414b.

Furthermore, the integration unit 234 determines that the tables 412d and 412e illustrated in FIG. 10 are tables respectively based on a "key having a list that has a map" and a "key directly having a value", and a key of one thereof is included in the key of the other (see (I-2) and (II-3) described above). Similarly, the integration unit 234 makes the same determination as that for the tables 412d and 412e also for the tables 412d and 412f illustrated in FIG. 10. In addition, in this case, the tables 412e and 412f are positioned at the same hierarchy and both correspond to a "key having a list that has a map" (see (I-1) and (II-2) described above). In this way, the integration unit 234 determines that the tables 412d, 412e, and 412f illustrated in FIG. 10 satisfy the second condition and integrates the tables 412d to 412f into one second table 414 (see table 414c illustrated in FIG. 12).

At this time, since "bookmarks" are common in the table names of the tables 412d to 412f, the integration unit 234 sets "bookmarks_.use_r.comment" acquired by combining "bookmarks", ".user", and ".comment" with "_" being interposed therebetween in the table name of the table 414c. In addition, as the column names of the table 414c, the integration unit 234 sets character strings acquired by changing the column name "parent" of the tables 412d to 412f to "_parent" and changing the column name "id" of the table 412d to "_id".

Furthermore, the integration unit 234, as the column names of the table 414c, sets character strings acquired by changing the column name "value" of the table 412e to "user" and changing the column name "value" of the table 412f to "comment".

In addition, the integration unit 234 integrates also the tables 412g and 412h illustrated in FIG. 11 into a second table 414 based on the same determination as that for the tables 412d and 412e (see table 414d illustrated in FIG. 12).

On the other hand, the integration unit 234 does not integrate the table 412i illustrated in FIG. 11 based on the same determination as that for the table 412c, changes the column names of the table 412i, and sets the table 412i as the second table 414 (see table 414e illustrated in FIG. 13).

As above, according to the processes performed by the generation unit 232 and the integration unit 234, the inputted data relating to a DDB is converted into a data model of an RDB.

[1-6-2] Case where Second Table is Generated in DB

Next, the process of the update unit 236 that is performed in a state in which the second table 414 is stored in the DB 41 will be described.

[1-6-2-1] Update Unit

The update unit 236 writes an inputted document into the second table 414 after the data model conversion. More specifically, the update unit 236 searches the inputted document for keys, for example, in order of description of character strings (in order from the vertex of a tree toward a child element) and updates a corresponding second table 414 for each key.

Further more specifically, the update unit 236 lists all the second tables 414 and specifies second tables 414 including a search key, in other words, second tables 414 each having portions of a table name that completely coincide with the name of the search key when the table name is divided into portions at each position of "_".

Then, the update unit 236 updates the second tables 414 that are update targets including the search key (that have been specified) based on a third condition defined in (1) to (4) described below.

(1) Case Where Search Key Directly Has Value:

The update unit 236 writes the value of a key in a column of the key name in a row (record) in which the column "_parent" of the second table 414 coincides with "parent" of the search key. In addition, in a case where such a row is not present, the update unit 236 newly creates (adds) the row and writes the value described above therein.

(2) Case Where Search Key Has List That Directly Has Value: The update unit 236 creates (adds) a row having "parent" of the search key in the column "parent" and having the value of the key in the column of the key name in the second table 414 that is an update target.

(3) Case Where Search Key Has Map: For the key, the update unit 236 does not update the second table 414 and does not create a table.

(4) Case Where Search Key Has List That Has Map: The update unit 236 writes a value of the key in a column of the key name in a row in which the column "_parent" of the second table 414 that is an update target coincides with "parent" of the search key. In addition, in a case where the row is not present, the update unit 236 creates (adds) a row and writes the value described above therein.

In addition, the update unit 236 determines whether the search key corresponds to one of (1) to (4) described above using the same technique as that used for the above-described determination of (A) and (B) that is made by the generation unit 232.

In this way, the update unit 236 specifies corresponding second table 414 for each of a plurality of keys included an inputted object and updates the specified second table 414 using a corresponding key according to the third condition.

According to the update unit 236 described above, in the state in which the corresponding second table 414 is present, the value of a key can be extracted from the update data having a hierarchical structure including a nested structure that is inputted in the first data format for each key of the update data. In addition, according to the update unit 236, the corresponding second table 414 can be updated based on the value of the extracted key. In this way, in a case where the second table 414 is stored in the DB 41 in advance, a document (update data) inputted in the first data format can be directly written into the second table 414 represented in the second data format by the update unit 236. Thus, according to the update unit 236, the speed of a conversion performed by the data model conversion engine 23 can be improved, and accordingly, the performance of accesses to the DB 41 using the information processing system 1 can be improved.

[1-6-2-2] Specific Example of Process Performed by Update Unit

Next, a specific example of the process performed by the update unit 236 described above will be described with reference to FIGS. 14 to 16. FIG. 14 is a diagram that illustrates an example of second tables 414 updated by the update unit 236 illustrated in FIG. 6, and FIGS. 15 and 16 are diagrams that illustrate examples of the second tables 414 after the update illustrated in FIG. 14. Here, as a premise, in the example illustrated in FIG. 14, only the document of "document-id: 20" illustrated in FIG. 7 assumed to be converted into the second table 414 by the generation unit 232 and the integration unit 234. FIGS. 15 and 16 illustrate the appearance in which the document of "document-id: 30" illustrated in FIG. 7 is newly inputted to the writing controller 230 according to a storage/update request, and the update unit 236 adds the document to the second table 414 illustrated in FIG. 14. In addition, reference signs starting with "T" attached in the tables 414a to 414e illustrated in FIGS. 15 and 16 represent the processing sequence performed by the update unit 236. Here, while this processing sequence corresponds to the order of character strings of the inputted document, the processing sequence is not limited thereto.

First, the update unit 236 extracts "document-id: 30 {" illustrated in FIG. 7 as an ID of a document (map) that is an update target (writing target) and memorizes "parent=30" in the memory 52 or the like in Process T51 (not illustrated in the figure).

Next, the update unit 236 extracts "url: "yyy"," from the document that is the update target and specifies the table 414a including the key "url" in the table name "url_title" from the second table 414 (see FIG. 14). In addition, the update unit 236 determines that the key "url" is a "key directly having a value" using the same technique as that used by the generation unit 232. Then, the update unit 236, based on (1) described above that is included in the third condition, adds a row having "30" in the "_parent" column and having "yyy" in the column "url" in the table 414a (Process T52 illustrated in FIG. 15).

In addition, for "title: "yahoo",", the update unit 236 determines that the key "title" is a "key directly having a value" that is included in the table 414a (see FIG. 14). Then, the update unit 236 stores "yahoo" in the column "title" in a row in which the column "_parent" of the table 414a is "30" (Process T53 illustrated in FIG. 15).

Next, the update unit 236 extracts "tags: ["yah"]," and specifies the table 414b having the key "tags" in the table name "tags" from among the second tables 414 (see FIG. 14). In addition, the update unit 236 determines that the key "tags" is a "key having a list that directly has a value". Then, the update unit 236, based on (2) described above that is included in the third condition, adds a row having "30" in the row "_parent" and having "yah" in the column "tags" to the table 414b (Process T54 illustrated in FIG. 15).

Next, the update unit 236 extracts "bookmarks: [{" and specifies the table 414c having the key "bookmarks" in the table name "bookmarks_.user_.comment" from among the second table 414 (see FIG. 14). In addition, the update unit 236 determines that the key "bookmarks" is a "key having a list that has a map". Then, the update unit 236, based on (4) described above that is included in the third condition, adds a row having "30" in the column "_parent" to the table 414c (Process T55 illustrated in FIG. 15). At this time, "2" that is automatically generated is stored in the column "_id".

In addition, for "user: "userA",", the update unit 236 determines that the key "user" is a "key directly having a value" that is included in the table 414c (see FIG. 14). Then, the update unit 236 stores "userA" in the column "user" in a row in which the column "_id" of the table 414c is "2" (Process T56 illustrated in FIG. 15). Similarly, for "comment: "yahoooooo",", the update unit 236 stores "yahoooooo" in the column "comment" in a row having "2" in the column "_id" of the table 414c (Process T57 illustrated in FIG. 15).

Next, for "tags: [{", the update unit 236 specifies the table 414d including the key "tags" in the table name "bokmarks.tags_.tag" from among the second tables 414 (see FIG. 14). In addition, the update unit 236 determines that the key "tags" is a "key having a list that has a map". Then, the update unit 236 adds a row having "2" in the column "_parent" to the table 414d (Process T58 illustrated in FIG. 15). At this time, "4" that is automatically generated is stored in the column "id".

In addition, for "tag: "yah",", the update unit 236 determines that the key "tag" is a "key directly having a value" that is included in the table 414d (see FIG. 14). Then, the update unit 236 stores "yah" in the column "tag" in a row in which the column "_id" of the table 414d is "4" (Process T59 illustrated in FIG. 15).

Next, for "chars: ["y"," the update unit 236 specifies the table 414e including the key "chars" in the table name "bookmarks.tags.chars" from the second tables 414 (see FIG. 14). In addition, the update unit 236 determines that the key "chars" is a "key having a list that directly has a value". Then, the update unit 236 adds a row having "4" in the column "_parent" and having "y" in the column "chars" to the table 414e (Process T60 illustrated in FIG. 16).

Also in Processes T61 to T65, the update unit 236, similar to the process described above, updates the tables 414a to 414e that have already been generated.

In addition, in Process T65, when the last "}" within the document (data) of "document-id:30" is detected, the update unit 236 determines whether or not another document that is an update target is included in the inputted storage/update request. In a case where another document that is an update target is present, the update unit 236, similar to Process T51, may memorize a value "xx" of "document-id" as "parent" in the memory 52 or the like.

[1-7] Reading Controller

The reading controller (reading unit) 240, in response to an inputted referring request, acquires data satisfying the condition designated in the referring request from the second table 414, converts the acquired data into a document (map) having the JSON format, and outputs the converted document to the application-side communication unit 210.

For example, the reading controller 240 acquires data that matches the read condition designated in the referring request from the second table 414 converted by the writing controller 230, and builds an (original) document. Here, examples of the read condition include "document-id: xx" of a reading target, one or more of specific second tables 414 and values thereof, or the like.

More specifically, when a referring request is inputted, the reading controller 240 initializes the document (map) of the return value to "{ }". In addition, the reading controller 240 performs the following process for a row, which is a reading target, matching the value of the read condition among the second tables 414 that are reading targets satisfying the read condition designated in the referring request. In addition, when only "document-id xx" is designated as the read condition, the second table 414 to be read and the value do not have to be designated. In such a case, the reading controller 240 performs the following process for a row matching "xx" included in the second table 414 of the top level.

Case Where UNIQUE Attribute Is Present in Column "_parent": The reading controller 240 sets the column name of each column other than the column "_parent" as "key", sets the value of the row, which is the reading target, arranged in the column "key" as "value", and adds the element of "key: value" to the map of return values. Here, the "key" is a "key directly having a value".

Case Where UNIQUE Attribute Is Not Present in Column "_parent" And Column "_id" Is Not Present: The reading controller 240 sets the column name of each column other than the column "_parent" as "key", sets the value of the row, which is the reading target, arranged in the column "key" as "value", and adds the element of "key: [value]" to the map of return values. Here, the "key" is a "key having a list that directly has a value". In a case where there are a plurality of rows, which are reading targets arranged in the column "key", a plurality of values "value" are set with being delimited by "," (comma) in the list "[ ]" of "key: [value]".

Case Where UNIQUE Attribute Is Not Present in Column "_parent" And Column "_id" Is Present: A last portion (the name of the key of a neighboring parent element), which is delimited by ".", of the common portion of the table names of the second tables 414 that are reading targets is set as "table". Then, the reading controller 240 adds the element of "table: [{ }]" to the map of return values. Here, the "table" is a "key having a list that has a map". Hereinafter, the last portion that is delimited by "." in the common portion of the table names may be represented as a common portion (last portion).

Here, the common portion (last portion) of the table name of the second table 414 may be a character string between "_" appearing first in the table name and "." that is positioned prior to "_" described above. However, in a case where "." is not present before "_" in the table name, the common portion (last portion) may be a character string between the lead of the table name and "_" appearing first in the table name. In addition, in a case where "_" is not present in the table name, the common portion (last portion) may be a character string between "." (in a case where "." is not present, the lead of the table name) appearing first from the tail of the table name toward the lead and the lead. For example, in the case of a table name "bookmarks_.user_.comment", "bookmarks" is the common portion (last portion), and, in the case of a table name "bookmarks.tags.tag", "tags" is the common portion (last portion). In addition, the common portion of the table name is a character string between the tail of the above-described common portion (last portion) and the lead of the table name in the table name.

In addition, in a case where a column other than the column "_parent" and the column "_id" is present, the reading controller 240, for each column other than the column "_parent" and the column "_id", sets each column name as "key" and sets the value of the row, which is the reading target, in the column "key" as "value". Then, the reading controller 240 adds the element of "key: value" to the map of the element of "table: [{ }]" in the map of return values.

Furthermore, in order to acquire a list "[ ]" of the column "_id" arranged in the row matching the value "xx" of "document-id" that is designated in the referring request, the reading controller 240 may call the reading controller 240 (recursive call) under the following read condition. Then, the reading controller 240 adds also a return value of the recursive call to the map "{ }" of "table: [{key: value}]" that is processed as a calling source. As the second table 414 of the read condition in the recursive call, among all the second tables 414 starting with a table name acquired by combining the common portion of the table name of the second table 414 and "key" with "." being interposed therebetween, a second table 414 other than the second table 414 that is the reading target in the calling source. In addition, a value of the read condition in the recursive call is the value of the column "_id" that is the reading target in the calling source.

Also in the process of the recursive call, the reading controller 240 acquires an element using the technique described above and adds the acquired element to the map of return values (in this case, a return value that is returned to the calling source). For example, in the recursive call, the reading controller 240 sets each column name as "key" in the row in which the value of the column "_parent" of the second table 414 that satisfies the condition designated from the calling source coincides with the value designated from the calling source and sets the value of the column "key" as "value". Then, the reading controller 240 adds elements of "key: value" and the like to the map of return values that is returned to the calling source.

In this way, the reading controller 240 can read a document having a tree structure including a nested structure from the second table 414. In addition, in the process of a recursive call, the reading controller 240 may further perform the recursive call. In such a case, a document read from the second table 414 has a tree structure including a multiple nested structure.

In addition, when the above-described process is performed for all the second tables 414 that are reading targets, the reading controller 240 outputs a generated map of return values to the application-side communication unit 210 together with a response to the referring request.

As above, the reading controller 240 acquires data of an object designated in the inputted referring request from one or more of the second tables 414, converts the acquired data into a format of a document, and responses to the application 21.

According to the reading controller 240 described above, information according to the read condition designated in the inputted reading request is acquired from the second tables 414, and, based on the information acquired from the second tables 414, read data having a hierarchical structure including a nested structure for the reading request can be generated. In other words, a document (read data) of the first data format can be directly extracted from the second tables 414 represented in the second data format and be generated by the reading controller 240. Thus, according to the reading controller 240, the speed of the conversion performed by the data model conversion engine 23 can be improved, whereby the performance of accesses to the DB 41 using the information processing system 1 can be improved.

[1-8] Example of Operation

Figure 17:
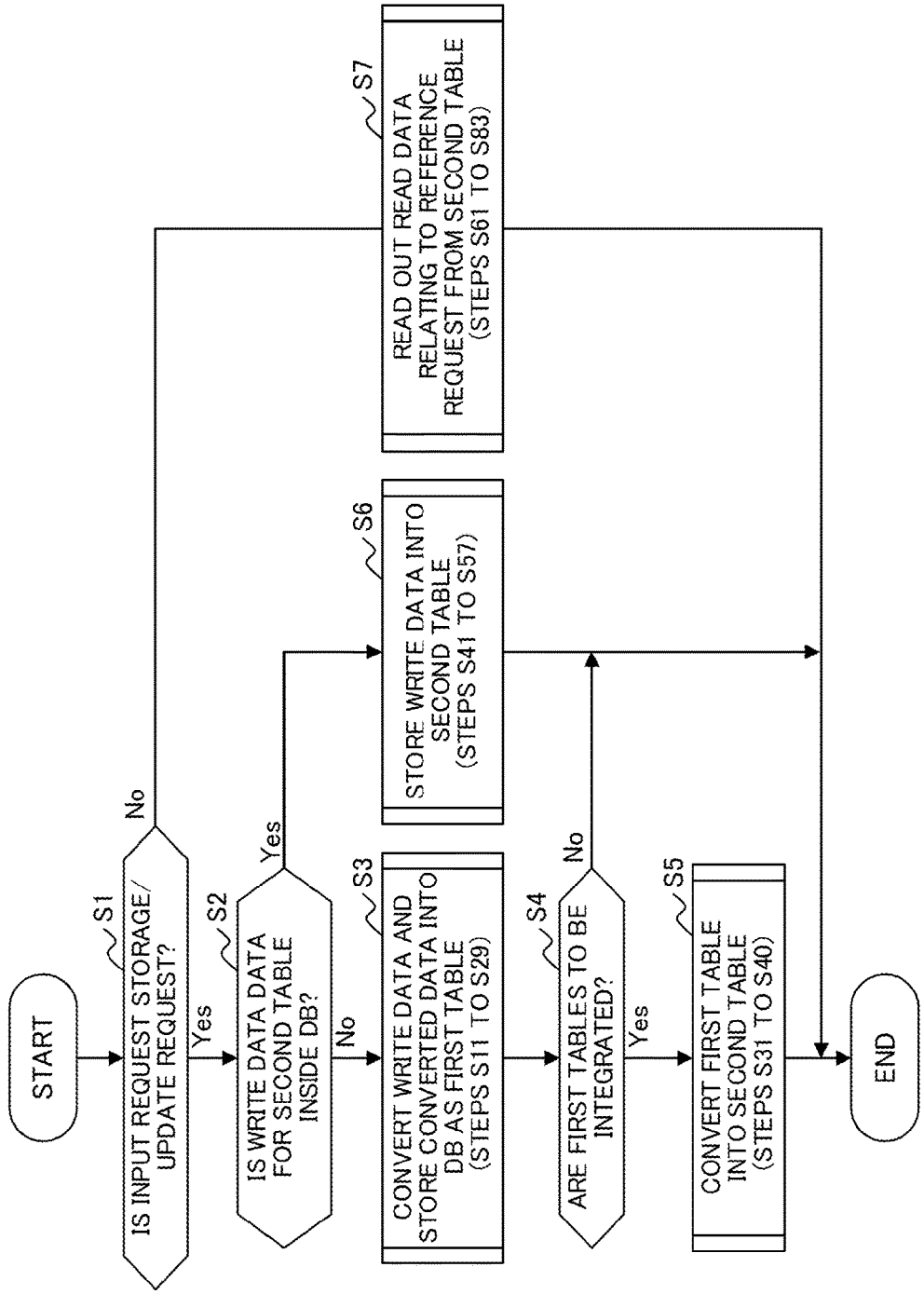
FIG. 17 is a flowchart that illustrates an example of the whole process performed by the data model conversion engine.
Figure 18:
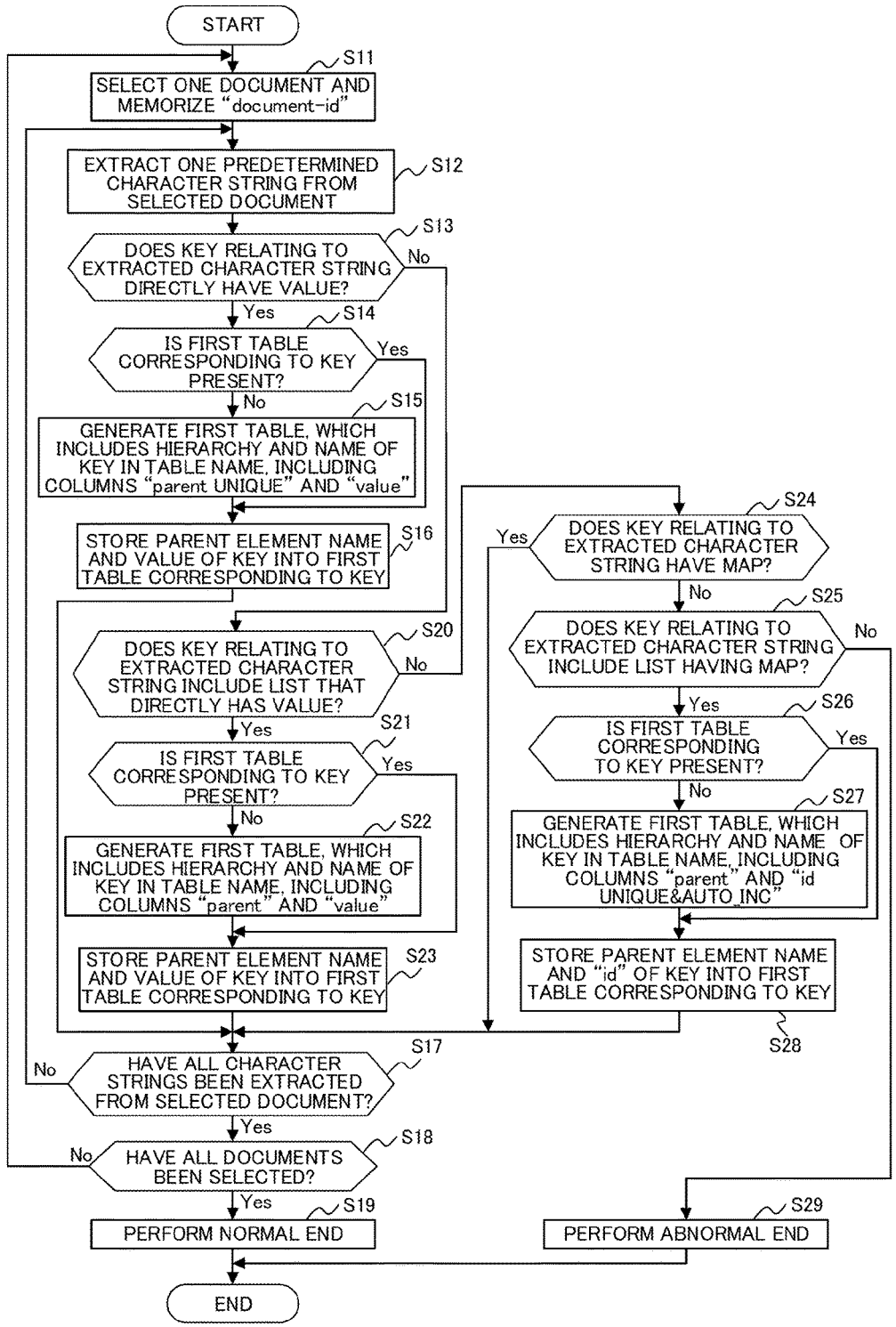
FIG. 18 is a flowchart that illustrates an example of a process performed by the generation unit.
Figure 19:
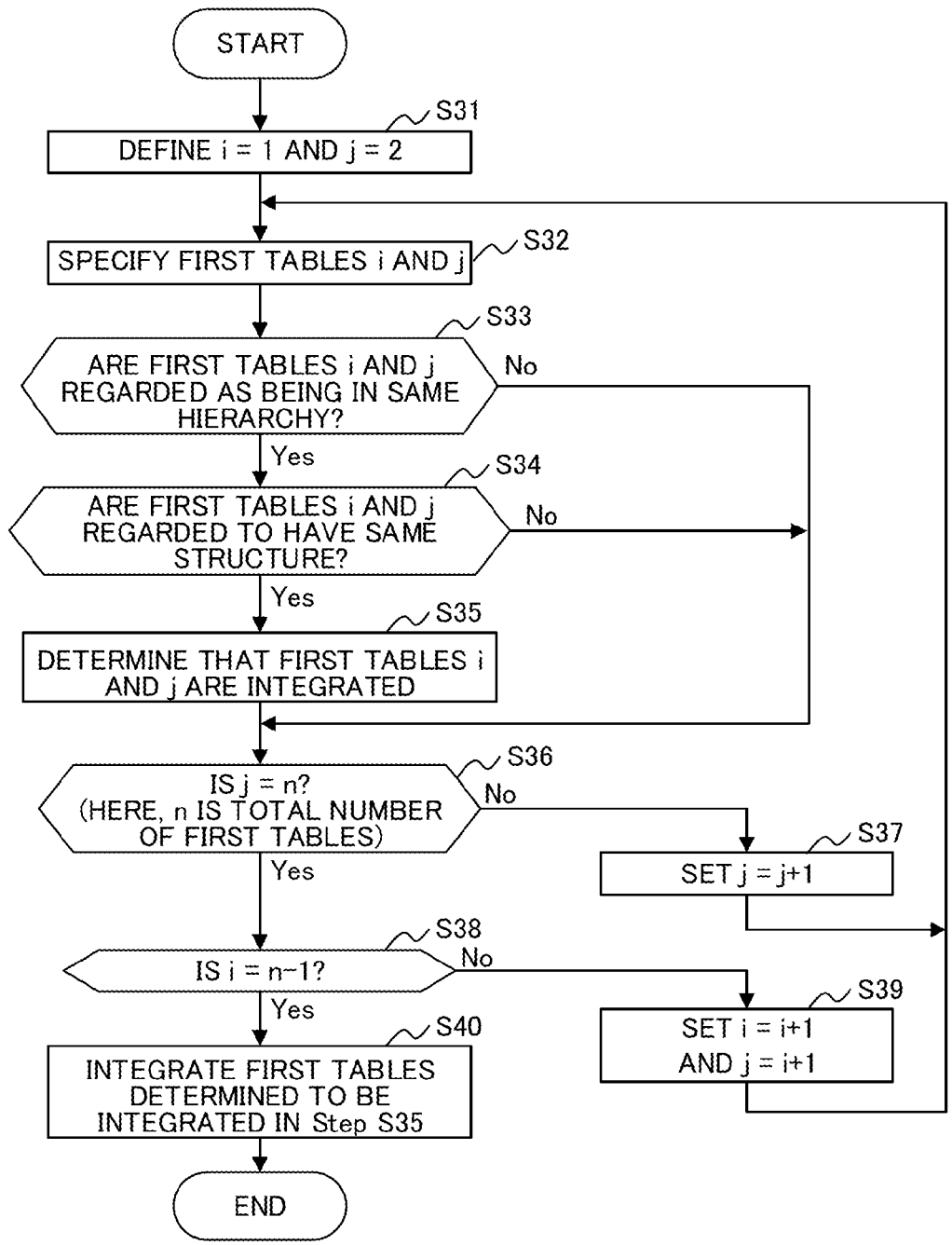
FIG. 19 is a flowchart that illustrates an example of a process performed by the integration unit.
Figure 20:
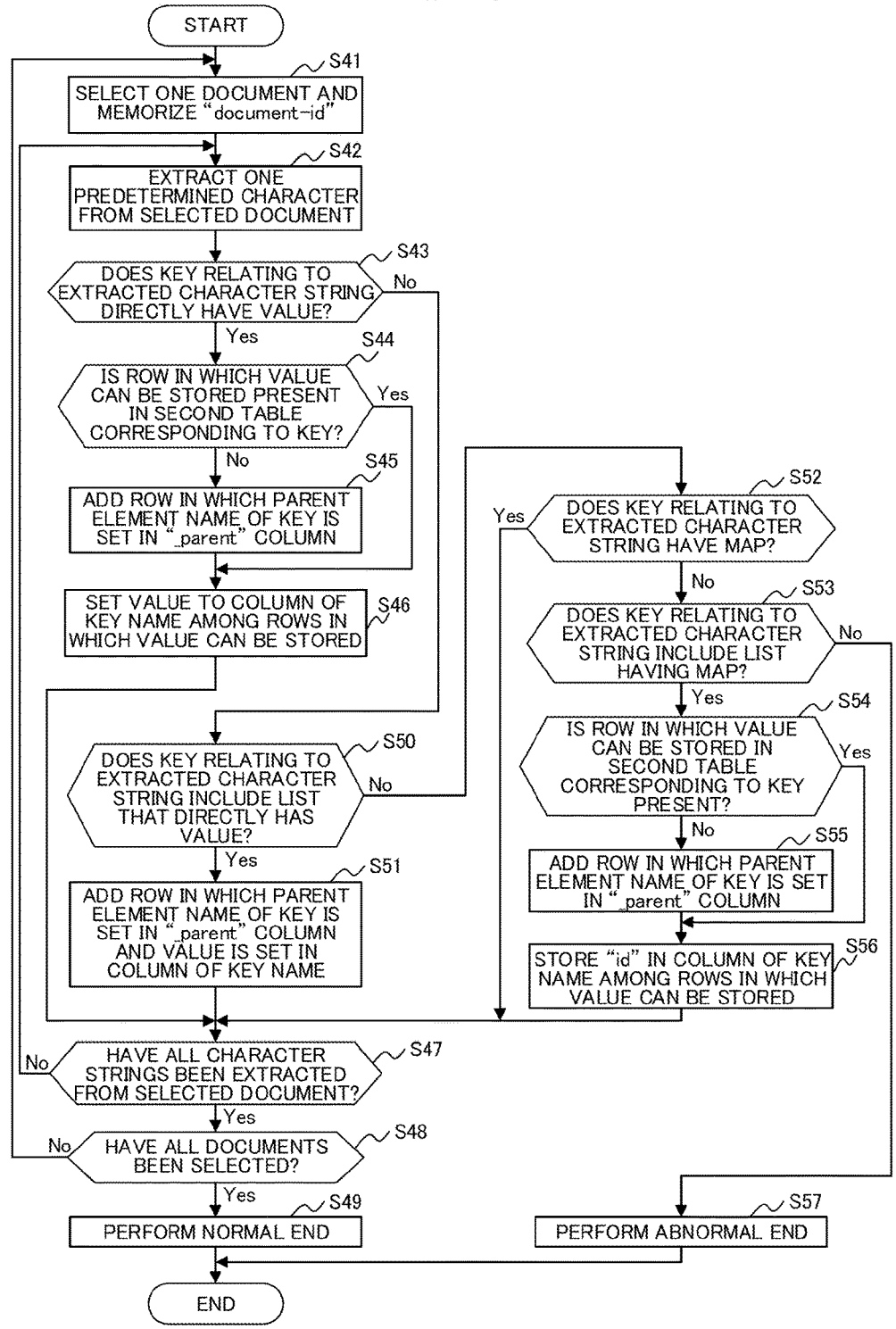
FIG. 20 is a flowchart that illustrates an example of a process performed by the update unit.
Figure 21:
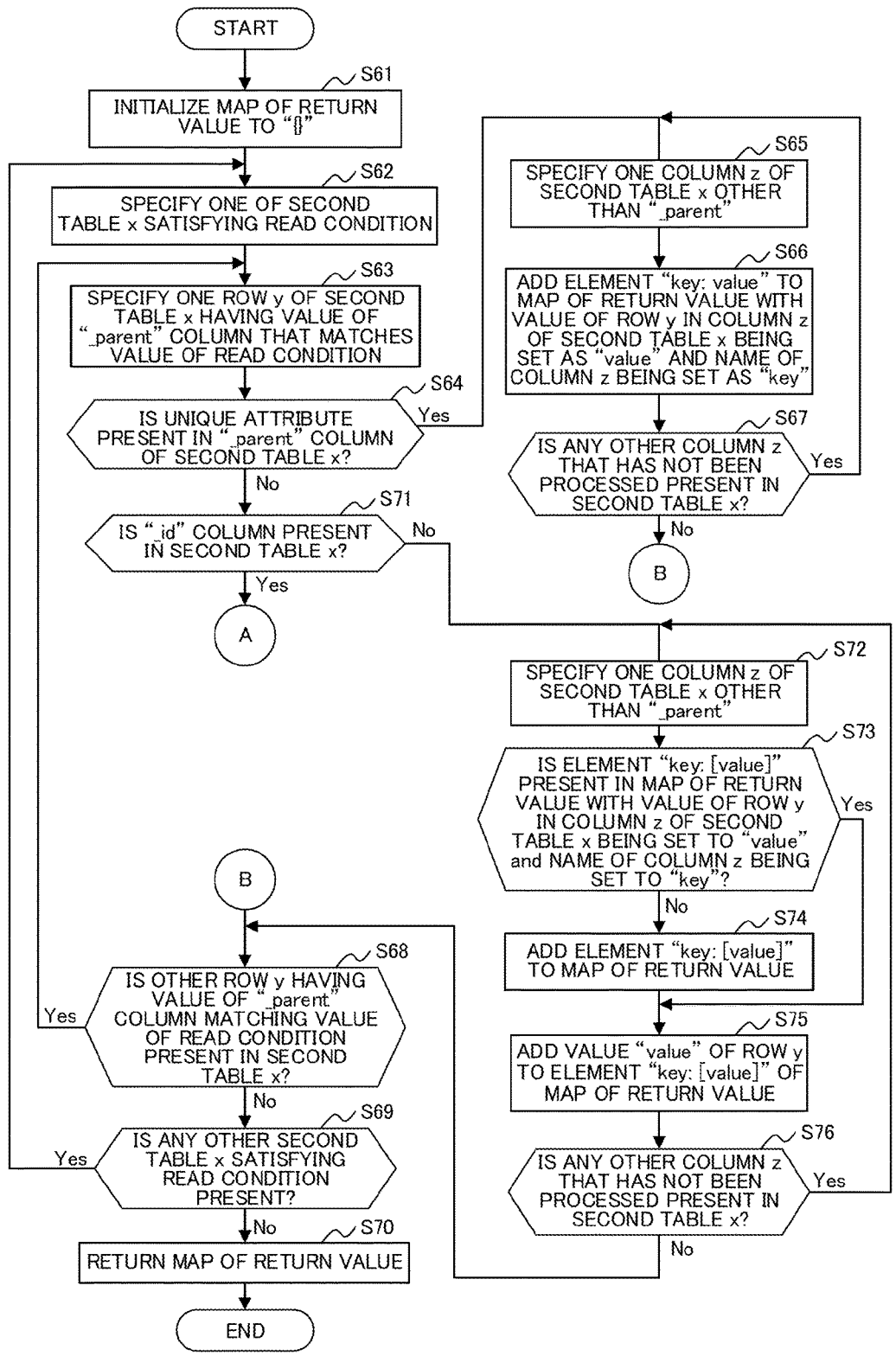
FIG. 21 is a flowchart that illustrates an example of a process performed by a reading controller.
Figure 22:
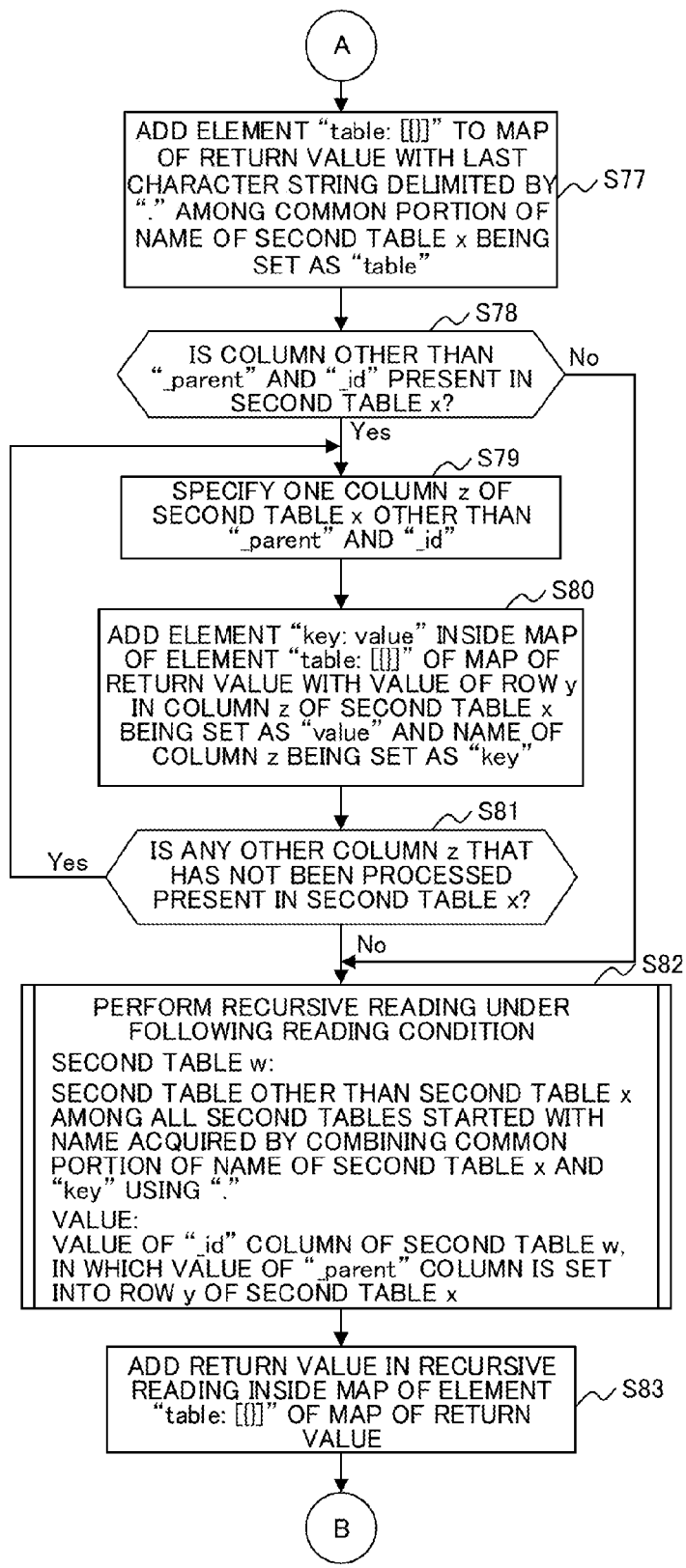
FIG. 22 is a flowchart that illustrates an example of a process performed by the reading controller.
Figure 23:
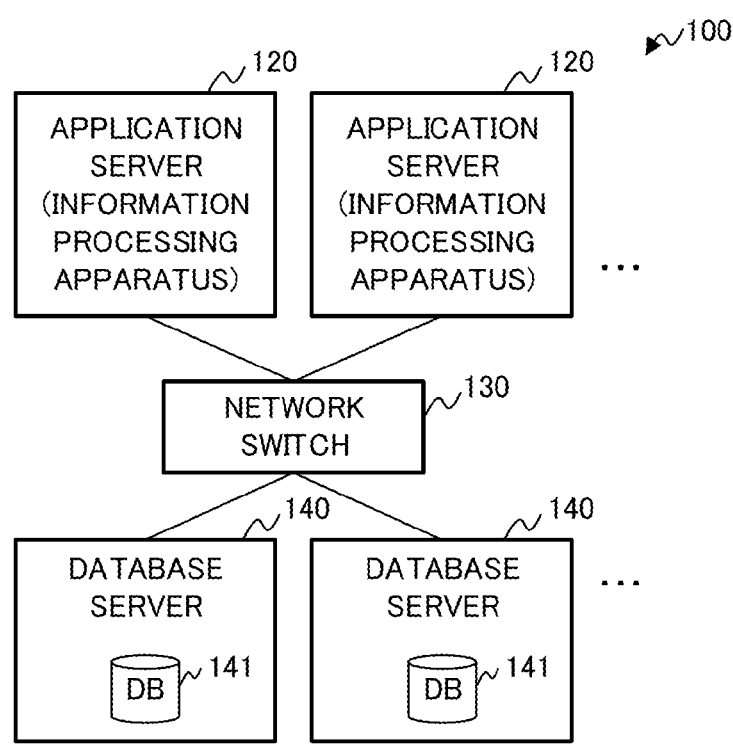
FIG. 23 is a diagram that illustrates an example of the configuration of an information processing system.
Figure 24:
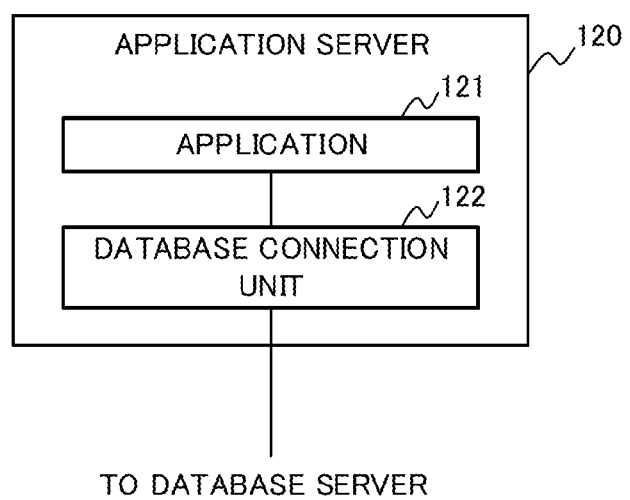
FIG. 24 is a diagram that illustrates an example of the functional configuration of the application server illustrated in FIG. 23.

Next, an example of the operation of the information processing system 1 (the data model conversion engine 23), which is configured as described above, according to an embodiment will be described with reference to FIGS. 17 to 22. FIG. 17 is a flowchart that illustrates an example of the whole process performed by the data model conversion engine 23. FIGS. 18 to 20 are flowcharts that illustrate examples of processes performed by the generation unit 232, the integration unit 234, and the update unit 236. FIGS. 21 and 22 are flowcharts that illustrate examples of the process performed by the reading controller 240.

[1-8-1] Example of Operation of Data Model Conversion Engine

First, the whole process performed by the data model conversion engine 23 will be described with reference to FIG. 17. The whole process illustrated in the flowchart represented in FIG. 17 is performed every time when any of various requests such as a storage/update request and a referring request is inputted through the application 21 from the application 21.

As illustrated in FIG. 17, it is determined whether a command inputted from the application 21 is a storage/update request by the application-side communication unit 210 in step S1. In a case where the inputted command is the storage/update request (Yes route step S1), the writing controller 230 is notified of the storage/update request from the application-side communication unit 210. The writing controller 230 determines whether or not a document (write data) relating to the storage/update request is for the second table 414 converted inside the DB 41, for example, a corresponding second table 414 is present inside the DB 41 in step S2.

In a case where the document is not for the second table 414 (No route of step S2), the process of the generation unit 232 is performed. In other words, the process of steps S11 to S29 to be described later is performed by the generation unit 232, and accordingly, the document is converted and is stored in the DB 41 as first tables 412 in step S3. In addition, it is determined by the writing controller 230 whether the generated first tables 412 are integrated, in other words, whether or not a conversion performed by the integration unit 234 is applied to the first tables 412 in step S4.

For example, in a case where the first tables 412 do not need to be integrated like a case where the document has a tree structure other than the nested structure (No route of step S4), the process ends. On the other hand, in a case where the first tables 412 are integrated together like a case where the document has a tree structure including a nested structure (Yes route of step S4), the process of the integration unit 234 is performed. In other words, the process of steps S31 to S40 to be described later is performed by the integration unit 234, whereby the first tables 412 are converted into a second table 414 (the first tables 412 are integrated together) in step S5, and the process ends.

On the other hand, in step S2, in a case where the document is for the second table 414 that is converted (Yes route of step S2), the process of the update unit 236 is performed. In other words, the process of steps S41 to S57 to be described later is performed by the update unit 236, and the document is stored in the second table 414 in step S6, and the process ends.

In addition, in step S1, in a case where the inputted command is not a storage/update request but, for example, a referring request (No route of step S1), the reading controller 240 is notified of the referring request from the application-side communication unit 210.

In the reading controller 240, the process of steps S61 to S83 to be described later is performed, and a document (read data) relating to the referring request is read from the second table 414 in step S7. In addition, the read document is output to the application 21 through the application-side communication unit 210, and the process ends.

[1-8-2] Example of Operation of Generation Unit

Next, the process performed by the generation unit 232 will be described with reference to FIG. 18.

As illustrated in FIG. 18, one document relating to the storage/update request is selected by the generation unit 232, and a value "xx" of "document-id" is stored in the memory 52 or the like in step S11. In addition, one predetermined character string is extracted from the selected document by the generation unit 232 in step S12. Then, it is determined whether or not a key relating to the extracted character string directly has a value by the generation unit 232 in step S13.

In a case where the key is a key directly having a value (Yes route of step S13), it is determined by the generation unit 232 whether or not the first table 412 corresponding to the key is present in the DB 41 in step S14. For example, the generation unit 232 determines whether or not a first table 412 of a name, which represents the hierarchy of the key, acquired by combining up to the key from the highest order with "." being interposed therebetween is present in the DB 41. In a case where the first table 412 corresponding to the key is not present (No route of step S14), a first table 412 having columns of "parent (having a UNIQUE attribute)" and "value" is generated in the DB 41 by the generation unit 232 in step S15. In addition, in the table name, a character string, which represents the hierarchy of the key, acquired by combining up to the key from the highest order with "." being interposed therebetween is set.

In a case where the process of step S15 is performed, or in a case where the first table 412 corresponding to the key is present (Yes route of step S14), a parent element name "parent" and a value "value" of the key are stored in the first table 412 by the generation unit 232 in step S16. Here, the parent element name of the key of the top level is the value "xx" of "document-id" stored in the memory 52.

Next, it is determined by the generation unit 232 whether all the character strings have been extracted from the selected document, for example, whether or not the end "}" of the document (map) has been detected in step S17. In a case where all the character strings have not been extracted from the selected document (No route of step S17), the process proceeds to step S12, and a next character string is extracted from the document by the generation unit 232.

On the other hand, in a case where all the character strings have been extracted from the selected document (Yes route of step S17), it is determined by the generation unit 232 whether or not all the documents relating to the inputted storage/update request have been selected in step S18. In a case where all the documents have not been selected (No route of step S18), the process proceeds to step S11, and a next document is selected by the generation unit 232, and the value "xx" of "document-id" is stored. On the other hand, in a case where all the documents have been selected (Yes route of step S18), it is determined by the generation unit 232 that the process relating to the storage/update request has normally ended in step S19, and the process ends. In addition, the writing controller 230 notifies the application 21 of a processing result (normal end) of the storage/update request through the application-side communication unit 210.

In step S13, in a case where the key is not a key directly having a value (No route of step S13), it is determined by the generation unit 232 whether or not the key relating to the extracted character string has a list directly having a value in step S20.

In a case where the key is a key having a list that directly has a value (Yes route of step S20), it is determined by the generation unit 232 whether or not the first table 412 corresponding to the key is present in the DB 41 in step S21. In a case where the first table 412 corresponding to the key is not present (No route of step S21), a first table 412 having columns of "parent" and "value" is generated in the DB 41 by the generation unit 232 in step S22.

In a case where the process of step S22 is performed, or in a case where the first table 412 corresponding to the key is present (Yes route of step S21), a parent element name "parent" and a value "value" of the key are stored in the first table 412 by the generation unit 232 in step S23. Then, the process proceeds to step S17.

In step S20, in a case where the key is not a key having a list that directly has a value (No route of step S20), it is determined by the generation unit 232 whether or not the key relating to the extracted character string has a map in step S24. In a case where the key is a key having a map (Yes route of step S24), the process proceeds to step S17. On the other hand, in a case where the key is not a key having a map (No route of step S24), it is determined by the generation unit 232 whether or not the key relating to the extracted character string has a list having a map in step S25.

In a case where the key is a key having a list that has a map (Yes route of step S25), it is determined by the generation unit 232 whether or not the first table 412 corresponding to the key is present in the DB 41 in step S26. In a case where the first table 412 corresponding to the key is not present (No route of step S26), a first table 412 is generated in the DB 41 by the generation unit 232 in step S27. The first table 412 generated here has columns of "parent" and "id (having a UNIQUE attribute and an AUTO_INCREMENT attribute)".

In a case where the process of step S27 is performed, or in a case where the first table 412 corresponding to the key is present (Yes route of step S26), a parent element name "parent" and "id" of the key are stored in the first table 412 by the generation unit 232 in step S28. Here, "id" is a value, which is automatically generated in ascending order, not overlapping the other "id". When the process of step S28 ends, the process proceeds to step S17.

On the other hand, in step S25, in a case where the key is not a key having a list that has a map (No route of step S25), there is a possibility that the document is not in a data format corresponding to a DDB such as the JSON format. Thus, it is determined by the generation unit 232 that an abnormality has occurred in the process relating to the storage/update request in step S29, and the process ends. In addition, the writing controller 230 notifies the application 21 of a processing result (abnormal end (ABEND)) of the storage/update request through the application-side communication unit 210.

As above, the process performed by the generation unit 232 ends. The processing sequence of the determinations performed in steps S13, S20, S24, and S25 is not limited to that described above, but the processing sequence may be changed.

[1-8-3] Example of Operation of Integration Unit

Next, the process performed by the integration unit 234 will be described with reference to FIG. 19.

As illustrated in FIG. 19, in order to sequentially compare the first tables 412, by the integration unit 234, variables i=1 and j=2 are defined in step S31, and the first tables i and j are specified in step S32. Here, the first tables i and j represent the i-th and j-th first tables 412 when the first tables 412 are sorted in arbitrary order such as generation-time order or ID order.

Next, it is determined by the integration unit 234 whether or not the first tables i and j can be regarded to be at the same hierarchy in step S33. In a case where the first tables i and j can be regarded at the same hierarchy (Yes route of step S33), it is determined by the integration unit 234 whether or not the first tables i and j can be regarded to have the same structure in step S34. In a case where the first tables i and j have the same structure (Yes route of step S34), it is determined by the integration unit 234 that the first tables i and j are integrated in step S35, and the process proceeds to step S36. In addition, in step S35, the integration unit 234 may store the values of i and j in the memory 52 or the like. On the other hand, also in a case where the first tables i and j are not positioned at the same hierarchy or do not have the same structure (No route of step S33 or No route of step S34), the process proceeds to step S36.

In step S36, it is determined whether or not j=n by the integration unit 234. Here, n is a total number of the first tables 412. In a case where "j=n" is not satisfied (No route of step S36), one is added to j by the integration unit 234 in step S37, and the process proceeds to step S32. On the other hand, in a case where j=n (Yes route of step S36), it is determined by the integration unit 234 whether "i=n−1" in step S38. In a case where "i=n−1" is not satisfied (No route of step S38), one is added to i. In addition, a value acquired by adding one to i to which one has been added is set to j by the integration unit 234 in step S39, and the process proceeds to step S32. The reason for setting j=i+1 is for preventing redundant comparisons of the first tables 412 due to interchange between the values of i and j by setting j to be constantly larger than i.

In a case where i=n−1 (Yes route of step S38), a set of the first tables 412 determined to be integrated in step S35 are integrated by the integration unit 234 by referring to one or more sets of i and j stored in the memory 52 or the like in step S40, and the process ends.

As above, the process performed by the integration unit 234 ends.

In this way, the integration unit 234 compares the first tables i and j for all the patterns by changing i and j. Then, the integration unit 234 integrates all the sets of first tables i and j that can be integrated. Here, the technique for changing i and j using the integration unit 234 is not limited to that described above, but various techniques may be used. In other words, the integration unit 234 may be configured to acquire all the patterns of sets of i and j by changing i and j such that i and j are not the same, and the values of i and j are not interchanged (for preventing redundant comparisons).

[1-8-4] Example of Operation of Update Unit

Next, the process performed by the update unit 236 will be described with reference to FIG. 20.

As illustrated in FIG. 20, by the update unit 236, one document relating to a storage/update request is selected, and a value "xx" of "document-id" is stored in the memory 52 or the like in step S41. In addition, one predetermined character string is extracted from the selected document by the update unit 236 in step S42. Then, it is determined by the update unit 236 whether or not a key relating to the extracted character string directly has a value in step S43.

In a case where the key is a key directly having a value (Yes route of step S43), it is determined by the update unit 236 whether or not there is a row in the second table 414 corresponding to the key in which a value can be stored in step S44. In a case where there is no row in which a value can be stored (No route of step S44), a row in which a parent element name of the key relating to the extracted character string is set in the column "_parent" is added to the second table 414 corresponding to the key by the update unit 236 in step S45. Here, the second table 414 corresponding to the key is the second table 414 having a table name acquired by combining up to the key from the highest order with "." being interposed therebetween.

In a case where the process of step S45 is performed, or in a case where there is a row in the second table 414 corresponding to the key in which a value can be stored (Yes route of step S44), a value "value" is stored in the column of the key name of the second table 414 by the update unit 236 in step S46.

Next, by the update unit 236, similar to the generation unit 232, it is determined whether or not all the character strings have been extracted from the selected document in step S47. In a case where all the character strings have not been extracted from the selected document (No route of step S47), the process proceeds to step S42, and a next character string is extracted from the document by the update unit 236.

On the other hand, in a case where all the character strings have been extracted from the selected document (Yes route of step S47), by the update unit 236, similar to the generation unit 232, it is determined whether or not all the documents relating to the inputted storage/update request have been selected in step S48. In a case where all the documents have not been selected (No route of step S48), the process proceeds to step S41, and a next document is selected by the update unit 236, and a value "xx" of "document-id" is stored. On the other hand, in a case where all the documents have been selected (Yes route of step S48), it is determined by the update unit 236 that the process relating to the storage/update request has normally ended in step S49, and the process ends. In addition, the writing controller 230 notifies the application 21 of a processing result (normal end) of the storage/update request through the application-side communication unit 210.

In step S43, in a case where the key is not a key directly having a value (No route of step S43), it is determined by the update unit 236 whether or not the key relating to the extracted character string has a list directly having a value in step S50.

In a case where the key is a key having a list that directly has a value (Yes route of step S50), a row in which a parent element name of the key is set in the column "_parent", and a value "value" is set in the column of the key name is added to the second table 414 corresponding to the key by the update unit 236 in step S51. Then, the process proceeds to step S47.

In step S50, in a case where the key is not a key having a list that directly has a value (No route of step S50), it is determined by the update unit 236 whether or not the key relating to the extracted character string has a map in step S52. In a case where the key is a key having a map (Yes route of step S52), the process proceeds to step S47. On the other hand, in a case where the key is not a key having a map (No route of step S52), it is determined by the update unit 236 whether or not the key relating to the extracted character string has a list that has a map in step S53.

In a case where the key is a key having a list that has a map (Yes route of step S53), it is determined by the update unit 236 whether or not a row in which a value can be stored is present in the second table 414 corresponding to the key in step S54. In a case where a row in which a value can be stored is not present (No route of step S54), a row in which a parent element name of the key relating to the extracted character string is set in the column "_parent" is added to the second table 414 corresponding to the key by the update unit 236 in step S55.

In a case where the process of step S55 is performed, or in a case where a row in which a value can be stored is present in the second table 414 (Yes route of step S54), a value "id" is stored in the column of the key name of the second table 414 by the update unit 236 in step S56. Here, "id" is a value, which is automatically generated in ascending order, not overlapping the other "id". When the process of step S56 ends, the process proceeds to step S47.

On the other hand, in step S53, in a case where the key is not a key having a list that has a map (No route of step S53), the occurrence of an abnormality in the process relating to the storage/update request is determined by the update unit 236 in step S57, and the process ends. In addition, the writing controller 230 notifies the application 21 of a processing result (abnormal end (ABEND)) of the storage/update request through the application-side communication unit 210.

As above, the process performed by the update unit 236 ends. The processing sequence of the determinations performed in steps S43, S50, S52, and S53 is not limited to that described above, but the processing sequence may be changed.

[1-8-5] Example of Operation of Reading Controller

Next, the process performed by the reading controller 240 will be described with reference to FIGS. 21 and 22.

As illustrated in FIG. 21, by the reading controller 240, the map of return values is initialized to "{ }" in step S61, and one second table 414 relating to a read condition designated in the referring request is specified in step S62. In addition, a row of the second table 414 in which the value of the column "_parent" matches the value of the read condition is specified by the reading controller 240 in step S63. Hereinafter, the specified second table 414 will be represented as second table x, and the specified row will be represented as row y.

Here, for example, in a case where a specific second table 414 is not designated in the read condition, and "document-id: xx" is designated, the second table x is the second table 414 of the top level. In the example illustrated in FIG. 12, the second table x is the table 414a including a column "_parent" that has a UNIQUE attribute. In addition, for example, in a case where the read condition represents one or more second tables 414, the second table x is one of the second tables 414.

Furthermore, for example, in a case where a value is not designated in the read condition, the specified row y is a row of the second table x in which the value of the column "_parent" coincides with a value "xx" of "document-id". In the example illustrated in FIG. 12, in the case of "document-id: 20", the row y is a row of the second table x in which the column "_parent" is "20". In addition, for example, in a case where the value of the read condition is a value "y" of "_id" or the like, the row y is one of all the rows in which a value of the column "_parent" is "y".

Next, it is determined by the reading controller 240 whether or not a UNIQUE attribute is present in the column "_parent" of the second table x in step S64. In a case where the UNIQUE attribute is present in the column "_parent" (Yes route of step S64), one column of the second table x other than the column "_parent" is specified by the reading controller 240 in step S65. Hereinafter, the specified column will be represented as column z.

Then, an element "key: value" having the value of the row y in the column z of the second table x being "value" and the name of the column z being "key" is added to the map of return values by the reading controller 240 in step S66. In addition, it is determined by the reading controller 240 whether or not another column z that has not been processed is present in the second table x in step S67. In a case where another column z that has not been processed is present (Yes route of step S67), the process proceeds to step S65. On the other hand, in a case where another column z that has not been processed is not present (No route of step S67), the process proceeds to step S68.

In step S68, it is determined by the reading controller 240 whether or not another row y in which the value of the column "_parent" matches the value of the read condition is present in the second table x. In a case where another row y is present in the second table x (Yes route of step S68), the process proceeds to step S63, and the process described above is performed for the another row y. On the other hand, in a case where another row y is not present in the second table x (No route of step S68), it is determined by the reading controller 240 whether or not another second table x satisfying the read condition is present in step S69.

In a case where another second table x satisfying the read condition is present (Yes route of step S69), the process proceeds to step S62, and the process described above is performed for the another second table x. On the other hand, in a case where another second table x satisfying the read condition is not present (No route of step S69), it is determined that the process relating to the referring request has normally ended by the reading controller 240. Then, the reading controller 240 notifies the application 21 of the map of return values through the application-side communication unit 210 together with a processing result of the referring request in step S70, and the process ends.

In step S64, in a case where the UNIQUE attribute is not present in the column "_parent" (No route of step S64), it is determined by the reading controller 240 whether a column "_id" is present in the second table x in step S71. In a case where the column "id" is not present in the second table x (No route of step S71), one row z other than the column "_parent" of the second table x is specified by the reading controller 240 in step S72.

Then, it is determined by the reading controller 240 whether or not an element "key: [value]" having the value of the row y in the column z of the second table x as "value" and the name of the column z as "key" is present in the map of return values in step S73. In a case where the element "key: [value]" is not present in the map of return values (No route of step S73), an element "key: [value]" is added to the map of return values by the reading controller 240 in step S74.

In a case where the process of step S74 is performed, or in a case where the element "key: [value]" is present in the map of return values (Yes route of step S73), a value "value" of the row y is added to the element "key: [value]" of the map of return values by the reading controller 240 in step S75. In addition, it is determined by the reading controller 240 whether or not another column z that has not been processed is present in the second table x in step S76. In a case where another column z that has not been processed is present (Yes route of step S76), the process proceeds to step S72. On the other hand, in a case where another column z that has not been processed is not present (No route of step S76), the process proceeds to step S68.

In step S71, in a case where a column "_id" is present in the second table x (Yes route of step S71), the process proceeds to step S77 illustrated in FIG. 22. As illustrated in FIG. 22, in step S77, an element "table: [{ }]" having the last character string (the character string of the common portion (last portion)) of the common portion of the name of the second table x, which is delimited by ".", as "table" is added to the map of return values by the reading controller 240.

Next, it is determined by the reading controller 240 whether or not a column other than the column "_parent"

and the column "_id" is present in the second table x in step S78. In a case where a column other than the column "_parent" and the column "_id" is present in the second table x (Yes route of step S78), one column z other than the column "_parent" and the column "_id" of the second table x is specified by the reading controller 240 in step S79.

Then, an element "key: value" having the value of the row y arranged in the column z of the second table x as "value" and having the name of the column z as "key" is added to the inside of the map of the element "table: [{ }]" of the map of return values by the reading controller 240 in step S80. In addition, it is determined by the reading controller 240 whether or not a column z that has not been processed is present in the second table x in step S81. In a case where another column z that has not been processed is present (Yes route of step S81), the process proceeds to step S79.

On the other hand, in a case where another column z that has not been processed is not present (No route of step S81), or in a case where a column other than the column "_parent" and the column "_id" is not present in the second table x in step S78 (No route of step S78), the process proceeds to step S82.

In step S82, a recursive reading is performed by the reading controller 240 with the read condition designating the second table w and values as below. For example, the second table w is assumed to be a second table 414 other than the second table x among all the second tables 414 having names each starting with a name acquired by combining a common portion of the name of the second table x and "key" with "." interposed therebetween. In addition, the value is assumed to be the value of the column "_id" of the second table w, in which the value of the column "_parent" is set into the row y of the second table x.

In step S82, when the recursive reading is completed and the map of return values is acquired, the return value from the recursive reading is stored inside the map of the element "table: [{ }]" in the map of return values of the reading source of the recursive reading by the reading controller 240 in step S83. Then, the process proceeds to step S68.

As above, the process performed by the reading controller 240 ends.

[1-9] Conclusion

As described above, according to the information processing system 1 of the embodiment, for each key of inputted data having a hierarchical structure including a nested structure, the first table 412 including the value of the key is generated by the generation unit 232. In addition, according to the nested structure of the data, a plurality of the first tables 412 are associated with other first tables 412 corresponding thereto by the generation unit 232. Then, the first tables 412 that satisfy a predetermined condition are integrated together among the plurality of the first tables 412 by the integration unit 234, whereby the second table 414 is generated.

Accordingly, a developer or the like of the application 21 can use an RDB having high performance and high stability as the DB (high-speed DB is used) while employing a DDB for which the application 21 is designed and updated for handling data having a complicated structure as it is. In addition, the developer and the like can determine a data model used by the application 21 and the DB server 4 in a flexible manner, and accordingly, the cost for the development of the information processing system 1 can be reduced.

For example, according to the data model conversion engine 23, at least some of the first tables 412 each generated for each key are integrated as one or more second tables 414 by the integration unit 234. Thus, the data size of the RDB arranged inside the DB 41 can be reduced to be less than that of a case where data having a tree structure including a nested structure is stored in an RDB as a single table form data (see (a) described above). In addition, compared to a case where data having a tree structure including a nested structure is simply stored in an RDB as a multiple table form data, the number of tables can be reduced. Accordingly, the number of tables that are referred to can be reduced, and, as a result, the memory consumption amount can be reduced.

In addition, according to the data model conversion engine 23, data having a tree structure having various nested or hierarchical structures can be adaptively converted into table form data, and accordingly, the degree of convenience is high.

Furthermore, according to the data model conversion engine 23, as an API provided for the application 21, an API transferring character strings of the JSON format or the BSON format, which has the degree of restriction to be higher than an object-oriented language, can be used. In this way, by using the API that transfers character strings in the form in which the structure of an object is converted into character strings instead of an API transferring an object in an object-oriented language, the design and the mounting of the data model conversion engine 23 can be simplified. As a result, the cost for the development of the data model conversion engine 23 can be reduced.

In addition, as illustrated in FIG. 5, the data model conversion engine 23 may be disposed between the application 21 handling the first data format and the DB connection unit 22 handling the second data format. In this way, the information processing system 1 can execute the application 21 that handles a DDB without substantially changing the function of the DB connection unit 22 handling an RDB and the DB server 4. Accordingly, the information processing system 1 can be designed in a more flexible manner, and the introduction/operating cost of the information processing system 1 can be reduced.

[2] Others

As above, while preferred embodiments of the present invention have been described in detail, the present invention is not limited thereto, but various modifications or changes may be made therein in a range not departing from the concept of the present invention.

For example, in an embodiment, while the data model conversion engine 23 has been described to be disposed between the application 21 and the DB connection unit 22 in the application server 2, the present invention is not limited thereto. For example, the data model conversion engine 23 may be arranged in the DB server 4 or may be disposed between the application server 2 and the DB server 4. In a case where the data model conversion engine 23 is arranged in the DB server 4, both the application 21 and the DB connection unit 22 can access the DB server 4 in the first data format of a DDB data model or the like. The data model conversion engine 23, in response to various requests entering the DB server 4, can access the DB 41 by using an RDB data model (second data format).

According to an embodiment, in an information processing apparatus, data having a tree structure including a nested structure can be easily handled with a decrease in the performance or an increase in the cost being suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising a processor, the processor is configured to
convert data of a hierarchical structure including a nested structure inputted in a first data format into a second data format representing the data using a plurality of tables and stores the converted data into a memory which is used for an application,
in the converting of the data, the processor:
generates, for each information element of the inputted data, a first table including a value of the information element, and associates each of a plurality of the first tables with a corresponding another first table according to the nested structure of the data, when a data storing request or a data updating request is transmitted from the application;
generates a second table by integrating two or more first tables, in which hierarchies to which information elements belong in the hierarchical structure are regarded to as the same, and in which the hierarchical structures are regarded to as the same among the plurality of the first tables; and
stores data which has the first data format extracted from the generated second table to the memory to output the extracted data to the application when a data reference request is transmitted from the application,
in the generating of the first table,
the processor sets a table name representing a hierarchy to which the information element belongs and element name of the information element in the first table to be generated, and
the processor sets a column according to the type of the information element into the first table to be generated, and
in the generating of the second table,
the processor detects the first tables in which hierarchies to which the information elements belong have a given relation based on the table names of the plurality of the first tables, and
the processor detects the first tables of which the types of the information elements have a given relation based on the columns of the plurality of the first tables.

2. The information processing apparatus according to claim 1, wherein the processor acquires information according to a read condition designated in an inputted read request from the second table and generates read data having a hierarchical structure including a nested structure for the read request based on the information acquired from the second table.

3. The information processing apparatus according to claim 1, wherein the processor extracts a value of the information element for each information element of update data from the update data having a hierarchical structure including the nested structure inputted in the first data format in a state in which the corresponding second table is present and updates the corresponding second table based on the extracted value of the information element.

4. A computer-readable recording medium having stored therein a data conversion program for causing a computer to execute a process in response to an inputted request for a memory, the process comprising:
converting data of a hierarchical structure including a nested structure inputted in a first data format into a second data format representing the data using a plurality of tables and storing the converted data into the memory which is used for an application,
in the converting of the data, the process further comprises:
generating a first table for each information element of the inputted data, a first table including a value of the information element, and associating each of a plurality of the first tables with a corresponding another first table according to the nested structure of the data, when a data storing request or a data updating request is transmitted from the application;
generating a second table by integrating two or more first tables, in which hierarchies to which information elements belong in the hierarchical structure are regarded to as the same, and in which the hierarchical structures are regarded to as the same among the plurality of the first tables; and
storing data which has the first data format extracted from the generated second table to the memory to output the extracted data to the application when a data reference request is transmitted from the application,
in the generating of the first table,
the process further comprising setting a table name representing a hierarchy to which the information element belongs and element name of the information element in the first table to be generated, and
setting a column according to the type of the information element into the first table to be generated, and
in the generating of the second table,
the process further comprising detecting the first tables in which hierarchies to which the information elements belong have a given relation based on the table names of the plurality of the first tables, and
detecting the first tables of which the types of the information elements have a given relation based on the columns of the plurality of the first tables.

5. The computer-readable recording medium according to claim 4, wherein the process further comprises:
acquiring information according to a read condition designated in an inputted read request from the second table; and
generating read data having a hierarchical structure including a nested structure for the read request based on the information acquired from the second table.

6. The computer-readable recording medium according to claim 4, wherein the process further comprises:
extracting a value of the information element for each information element of update data from the update data having a hierarchical structure including the nested structure inputted in the first data format in a state in which the corresponding second table is present; and
updating the corresponding second table based on the extracted value of the information element.

7. A data conversion method comprising:
converting data of a hierarchical structure including a nested structure inputted in a first data format into a second data format representing the data using a plurality of tables and storing the converted data into a memory which is used for an application, in the converting of data, the method further comprises:

generating for each information element of the inputted data, a first table including a value of the information element, and associating each of a plurality of the first tables with a corresponding another first table according to the nested structure of the data, when a data storing request or a data updating request is transmitted from the application;

generating a second table by integrating two or more first tables, in which hierarchies to which information elements belong in the hierarchical structure are regarded to as the same, and in which the hierarchical structures are regarded to as the same among the plurality of the first tables; and storing data which has the first data format extracted from the generated second table to the memory to output the extracted data to the application when a data reference request is transmitted from the application, in the generating of the first table, the method further comprising setting a table name representing a hierarchy to which the information element belongs and element name of the information element in the first table to be generated, and setting a column according to the type of the information element into the first table to be generated, and in the generating of the second table, the method further comprising detecting the first tables in which hierarchies to which the information elements belong have a relation based on the table names of the plurality of the first tables, and detecting the first tables of which the types of the information elements have a given relation based on the columns of the plurality of the first tables.

8. The data conversion method according to claim 7, further comprising:

acquiring information according to a read condition designated in an inputted read request from the second table; and generating read data having a hierarchical structure including a nested structure for the read request based on the information acquired from the second table.

9. The data conversion method according to claim 7, further comprising:

extracting a value of the information element for each information element of update data from the update data having a hierarchical structure including the nested structure inputted in the first data format in a state in which the corresponding second table is present; and updating the corresponding second table based on the extracted value of the information element.

* * * * *